(12) United States Patent
Yang et al.

(10) Patent No.: US 12,363,296 B2
(45) Date of Patent: *Jul. 15, 2025

(54) PREDICTION MODE DETERMINING METHOD AND APPARATUS, ENCODING DEVICE, AND DECODING DEVICE

(71) Applicant: HUAWEI TECHNOLOGIES CO., LTD., Guangdong (CN)

(72) Inventors: Haitao Yang, Shenzhen (CN); Yin Zhao, Hangzhou (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,588

(22) Filed: Jan. 14, 2024

(65) Prior Publication Data

US 2024/0297993 A1 Sep. 5, 2024

Related U.S. Application Data

(63) Continuation of application No. 17/357,684, filed on Jun. 24, 2021, now Pat. No. 11,895,297, which is a
(Continued)

(30) Foreign Application Priority Data

Dec. 27, 2018 (CN) .......................... 201811613699.3
Mar. 22, 2019 (CN) .......................... 201910222962.4

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/96* (2014.11)

(58) Field of Classification Search
CPC .. H04N 19/119; H04N 19/159; H04N 19/176; H04N 19/96; H04N 19/124; H04N 19/13; H04N 19/85; H04N 19/107
See application file for complete search history.

(56) References Cited

U.S. PATENT DOCUMENTS

2008/0175492 A1 7/2008 Han et al.
2011/0182523 A1* 7/2011 Kim ..................... H04N 19/176
382/233
(Continued)

FOREIGN PATENT DOCUMENTS

CN 103533325 A 1/2014
CN 104023241 A 9/2014
(Continued)

OTHER PUBLICATIONS

ITU-T H.261 (Mar. 1993), Line Transmission of Non-Telephone Signals, Video Codec for Audiovisual Services at p x 64 kbits, total 29 pages.
(Continued)

*Primary Examiner* — Nam D Pham

(57) ABSTRACT

A prediction mode determining method includes determining a split mode for a current picture block, determining whether a first picture subblock that meets a preset condition is obtained after the current picture block is split in the split mode, splitting the current picture block in the split mode to obtain a plurality of picture subblocks in response to determining that the first picture subblock is obtained after the current picture block is split, and determining that a same prediction mode is used for the plurality of picture subblocks. The plurality of picture subblocks comprise the first
(Continued)

picture subblock. The prediction mode for the plurality of picture subblocks is an intra prediction mode or an inter prediction mode.

19 Claims, 11 Drawing Sheets

Related U.S. Application Data continuation of application No. PCT/CN2019/121312, filed on Nov. 27, 2019.

(51) Int. Cl.
  *H04N 19/176* (2014.01)
  *H04N 19/96* (2014.01)

(56) References Cited

U.S. PATENT DOCUMENTS

| | | |
|---|---|---|
| 2012/0008676 A1 | 1/2012 | Lee et al. |
| 2012/0020579 A1 | 1/2012 | Choi et al. |
| 2015/0124874 A1 | 5/2015 | Pace et al. |
| 2017/0332078 A1 | 11/2017 | Lim et al. |

FOREIGN PATENT DOCUMENTS

| | | |
|---|---|---|
| CN | 105245877 A | 1/2016 |
| CN | 103748877 B | 5/2017 |
| CN | 107431806 A | 12/2017 |
| WO | 2017086738 A1 | 5/2017 |
| WO | 2017165509 A1 | 9/2017 |
| WO | 2018123313 A1 | 7/2018 |

OTHER PUBLICATIONS

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.
ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.

* cited by examiner

PREDICTION MODE DETERMINING METHOD AND APPARATUS, ENCODING DEVICE, AND DECODING DEVICE

CROSS-REFERENCE TO RELATED APPLICATIONS

This application is a continuation of U.S. patent application Ser. No. 17/357,684, filed on Jun. 24, 2021, which is a continuation of International Application No. PCT/CN2019/121312, filed on Nov. 27, 2019, which claims priority to Chinese Patent Application No. 201811613699.3, filed on Dec. 27, 2018 and Chinese Patent Application No. 201910222962.4, filed on Mar. 22, 2019, All of the aforementioned patent applications are hereby incorporated by reference in their entireties.

TECHNICAL FIELD

This application relates to the field of video coding, and in particular, to a prediction mode determining method and apparatus, an encoding device, and a decoding device.

BACKGROUND

Video coding (video encoding and decoding) is used in a wide range of digital video applications, for example, broadcast digital television, video transmission over the internet and mobile networks, real-time conversational applications such as video chat and video conferencing, DVDs and Blu-ray discs, video content collection and editing systems, and security applications of camcorders.

With development of a block-based hybrid video coding approach in the H.261 standard in 1990, new video coding technologies and tools are developed and form a basis for new video coding standards. Other video coding standards include MPEG-1 video, MPEG-2 video, ITU-T H.262/MPEG-2, ITU-T H.263, ITU-T H.264/MPEG-4 Part 10 advanced video coding (Advanced Video Coding, AVC), and ITU-T H.265/high efficiency video coding (High Efficiency Video Coding, HEVC), and extensions of such standards, for example, scalability and/or 3D (three-dimensional) extensions of such standards. As videos are created and used more widely, video traffic is a biggest burden on communication networks and data storage. Therefore, one of goals of most of the video coding standards is to reduce a bit rate without sacrificing picture quality in comparison with a previous standard. Even though the latest HEVC enables a video to be compressed about twice as much as the AVC without sacrificing picture quality, a new technology is urgently needed to further compress the video in comparison with the HEVC.

When a frame of picture is to be coded, the picture is first split into picture blocks of a same size, where the picture blocks are referred to as largest coding units (Largest Coding Unit, LCU); and then a recursive split operation is performed on one LCU, so that one or more coding units (Coding Unit, CU) can be obtained. There are two types of LCUs: 128×128 and 64×64. In an existing coding standard, a binary tree (Binary Tree, BT) (including horizontal binary tree (Horizontal Binary Tree, HBT) and vertical binary tree (Vertical Binary Tree, VBT)) split mode and an extended quadtree (Extended Quad Tree, EQT) (including horizontal extended quadtree (Horizontal Extended Quad Tree, HEQT) and vertical extended quadtree (Vertical Extended Quad Tree, VEQT)) split mode are added based on a quadtree (Quad-Tree, QT) split. Therefore, one picture block is split into a plurality of different CUs, and different prediction modes may be used for the CUS.

However, processing efficiency of a picture block whose area is less than 64 is very low.

SUMMARY

Embodiments of this application provide a prediction mode determining method and apparatus, an encoding device, and a decoding device. In a process of determining a prediction mode for a current picture block based on a bitstream of the current picture block, there is no need to parse all bitstreams, thereby facilitating hardware pipeline processing.

According to a first aspect, this application provides a prediction mode determining method, including: determining a split mode for a current picture block; determining whether a first picture subblock that meets a preset condition is obtained after the current picture block is split in the split mode; if it is determined that the first picture subblock is obtained after the split, splitting the current picture block in the split mode to obtain a plurality of picture subblocks, where the plurality of picture subblocks include the first picture subblock; and determining that a same prediction mode is used for the plurality of picture subblocks, where the prediction mode for the plurality of picture subblocks is an intra prediction mode or an inter prediction mode.

In a possible implementation, the preset condition includes that an area of the first picture subblock is less than or equal to a specified threshold.

In a possible implementation, the determining that a same prediction mode is used for the plurality of picture subblocks includes: parsing a bitstream of the current picture block to determine a prediction mode for a second picture subblock, where the second picture subblock is a picture subblock that is first determined as a coding unit CU in the plurality of picture subblocks according to a processing sequence, and the prediction mode for the second picture subblock is the intra prediction mode or the inter prediction mode; and determining a prediction mode for a picture subblock other than the second picture subblock in the plurality of picture subblocks based on the prediction mode for the second picture subblock, where the prediction mode for the picture subblock and the prediction mode for the second picture subblock are both the intra prediction mode or the inter prediction mode.

In a possible implementation, the inter prediction mode includes a skip mode, a direct mode, or a common inter mode.

In a possible implementation, the determining a prediction mode for a picture subblock other than the second picture subblock in the plurality of picture subblocks based on the prediction mode for the second picture subblock includes: when the prediction mode for the second picture subblock is the inter prediction mode, parsing the bitstream to obtain a skip mode identifier of the picture subblock, and determining, based on the skip mode identifier, whether the prediction mode for the picture subblock is the skip mode; and if the skip mode identifier indicates that the skip mode is used, determining that the prediction mode for the picture subblock is the skip mode.

In a possible implementation, the determining a prediction mode for a picture subblock other than the second picture subblock in the plurality of picture subblocks based on the prediction mode for the second picture subblock further includes: if the skip mode identifier indicates that the skip mode is not used, parsing the bitstream to obtain a direct mode identifier of the picture subblock, and determining, based on the direct mode identifier, whether the prediction mode for the picture subblock is the direct mode; and if the direct mode identifier indicates that the direct mode is used, determining that the prediction mode for the picture subblock is the direct mode; or if the direct mode identifier indicates that the direct mode is not used, determining that the prediction mode for the picture subblock is the common inter mode.

In a possible implementation, the determining a prediction mode for a picture subblock other than the second picture subblock in the plurality of picture subblocks based on the prediction mode for the second picture subblock includes: when the prediction mode for the second picture subblock is the intra prediction mode, parsing the bitstream to determine that the prediction mode for the picture subblock is one of intra prediction modes.

In a possible implementation, the determining whether a first picture subblock that meets a preset condition is obtained after the current picture block is split in the split mode includes: if an area of the current picture block meets the following condition, determining that the first picture subblock is obtained after the split: when the split mode is a binary tree BT split mode, sizeC/2 is less than S, where sizeC is the area of the current picture block, and S is a preset area threshold; or when the split mode is a quadtree QT split mode, sizeC/4 is less than S; or when the split mode is an extended quadtree EQT split mode, sizeC/4 is less than S.

In a possible implementation, after the determining whether a first picture subblock that meets a preset condition is obtained after the current picture block is split in the split mode, the method further includes: if it is determined that the first picture subblock is not obtained after the split, splitting the current picture block in the split mode to obtain a plurality of picture subblocks, separately determining split modes for the plurality of picture subblocks, and splitting each of the picture subblocks in a corresponding split mode.

In a possible implementation, the parsing a bitstream of the current picture block to determine a prediction mode for a second picture subblock includes: parsing the bitstream to obtain a skip mode identifier of the second picture subblock, and determining, based on the skip mode identifier, whether the prediction mode for the second picture subblock is the skip mode; and if the skip mode identifier indicates that the skip mode is used, determining that the prediction mode for the second picture subblock is the skip mode.

In a possible implementation, the parsing a bitstream of the current picture block to determine a prediction mode for a second picture subblock further includes: if the skip mode identifier indicates that the skip mode is not used, parsing the bitstream to obtain a direct mode identifier of the second picture subblock, and determining, based on the direct mode identifier, whether the prediction mode for the second picture subblock is the direct mode; and if the direct mode identifier indicates that the direct mode is used, determining that the prediction mode for the second picture subblock is the direct mode.

In a possible implementation, the parsing a bitstream of the current picture block to determine a prediction mode for a second picture subblock further includes: if the direct mode identifier indicates that the direct mode is not used, parsing the bitstream to obtain a prediction mode identifier of the second picture subblock, and determining, based on the prediction mode identifier, whether the prediction mode for the second picture subblock is the intra prediction mode; and if the prediction mode identifier indicates that the intra prediction mode is used, determining that the prediction mode for the second picture subblock is the intra prediction mode; or if the prediction mode identifier indicates that the common inter mode is used, determining that the prediction mode for the second picture subblock is the common inter mode.

In the embodiments of this application, in a process of determining the prediction mode for the current picture block based on the bitstream of the current picture block, a prediction mode for another picture subblock, especially a picture subblock with a relatively small area, is determined based on a prediction mode for a picture subblock obtained by splitting the current picture block. Therefore, there is no need to parse all bitstreams, and a prediction mode that is the same as that of the another picture subblock is used for a picture subblock with a small area, thereby facilitating hardware pipeline processing.

According to a second aspect, this application provides a prediction mode determining apparatus, including: a determining module, configured to determine a split mode for a current picture block; a judging module, configured to determine whether a first picture subblock that meets a preset condition is obtained after the current picture block is split in the split mode; a split module, configured to: if it is determined that the first picture subblock is obtained after the split, split the current picture block in the split mode to obtain a plurality of picture subblocks, where the plurality of picture subblocks include the first picture subblock; and a prediction module, configured to determine that a same prediction mode is used for the plurality of picture subblocks, where the prediction mode for the plurality of picture subblocks is an intra prediction mode or an inter prediction mode.

In a possible implementation, the preset condition includes that an area of the first picture subblock is less than or equal to a specified threshold.

In a possible implementation, the prediction module is specifically configured to: parse a bitstream of the current picture block to determine a prediction mode for a second picture subblock, where the second picture subblock is a picture subblock that is first determined as a coding unit CU in the plurality of picture subblocks according to a processing sequence, and the prediction mode for the second picture subblock is the intra prediction mode or the inter prediction mode; and determine a prediction mode for a picture subblock other than the second picture subblock in the plurality of picture subblocks based on the prediction mode for the second picture subblock, where the prediction mode for the picture subblock and the prediction mode for the second picture subblock are both the intra prediction mode or the inter prediction mode.

In a possible implementation, the inter prediction mode includes a skip mode, a direct mode, or a common inter mode.

In a possible implementation, the prediction module is specifically configured to: when the prediction mode for the second picture subblock is the inter prediction mode, parse the bitstream to obtain a skip mode identifier of the picture subblock, and determine, based on the skip mode identifier, whether the prediction mode for the picture subblock is the skip mode; and if the skip mode identifier indicates that the skip mode is used, determine that the prediction mode for the picture subblock is the skip mode.

In a possible implementation, the prediction module is further configured to: if the skip mode identifier indicates that the skip mode is not used, parse the bitstream to obtain a direct mode identifier of the picture subblock, and determine, based on the direct mode identifier, whether the prediction mode for the picture subblock is the direct mode; and if the direct mode identifier indicates that the direct mode is used, determine that the prediction mode for the picture subblock is the direct mode; or if the direct mode identifier indicates that the direct mode is not used, determine that the prediction mode for the picture subblock is the common inter mode.

In a possible implementation, the prediction module is specifically configured to: when the prediction mode for the second picture subblock is the intra prediction mode, parse the bitstream to determine that the prediction mode for the picture subblock is one of intra prediction modes.

In a possible implementation, the judging module is specifically configured to: if an area of the current picture block meets the following condition, determine that the first picture subblock is obtained after the split: when the split mode is a binary tree BT split mode, sizeC/2 is less than S, where sizeC is the area of the current picture block, and S is a preset area threshold; or when the split mode is a quadtree QT split mode, sizeC/4 is less than S; or when the split mode is an extended quadtree EQT split mode, sizeC/4 is less than S.

In a possible implementation, the split module is further configured to: if it is determined that the first picture subblock is not obtained after the split, split the current picture block in the split mode to obtain a plurality of picture subblocks, separately determine split modes for the plurality of picture subblocks, and split each of the picture subblocks in a corresponding split mode.

In a possible implementation, the prediction module is specifically configured to: parse the bitstream to obtain a skip mode identifier of the second picture subblock, and determine, based on the skip mode identifier, whether the prediction mode for the second picture subblock is the skip mode; and if the skip mode identifier indicates that the skip mode is used, determine that the prediction mode for the second picture subblock is the skip mode.

In a possible implementation, the prediction module is further configured to: if the skip mode identifier indicates that the skip mode is not used, parse the bitstream to obtain a direct mode identifier of the second picture subblock, and determine, based on the direct mode identifier, whether the prediction mode for the second picture subblock is the direct mode; and if the direct mode identifier indicates that the direct mode is used, determine that the prediction mode for the second picture subblock is the direct mode.

In a possible implementation, the prediction module is further configured to: if the direct mode identifier indicates that the direct mode is not used, parse the bitstream to obtain a prediction mode identifier of the second picture subblock, and determine, based on the prediction mode identifier, whether the prediction mode for the second picture subblock is the intra prediction mode; and if the prediction mode identifier indicates that the intra prediction mode is used, determine that the prediction mode for the second picture subblock is the intra prediction mode; or if the prediction mode identifier indicates that the common inter mode is used, determine that the prediction mode for the second picture subblock is the common inter mode.

According to a third aspect, this application provides a video encoding device, including a non-volatile memory and a processor that are coupled to each other. The processor invokes program code stored in the memory, to perform the method in the first aspect.

According to a fourth aspect, this application provides a video decoding device, including a non-volatile memory and a processor that are coupled to each other. The processor invokes program code stored in the memory, to perform the method in the first aspect.

According to a fifth aspect, an embodiment of this application provides a computer program product. When the computer program product is run on a computer, the computer is enabled to perform some or all of the steps of the method in the first aspect.

It should be understood that the technical solutions in the second aspect to the fifth aspect of this application are consistent with the technical solution in the first aspect. Beneficial effects achieved in the various aspects and corresponding feasible implementations are similar, and details are not described again.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

Figure 1A:
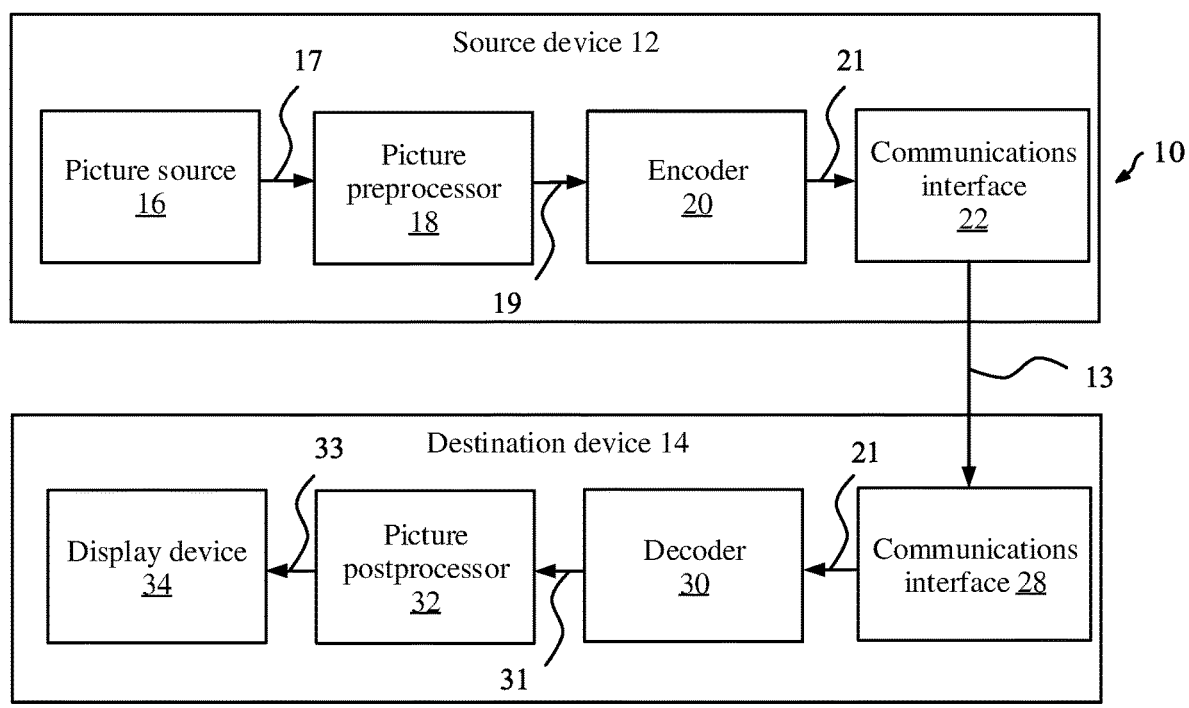
FIG. 1A is a block diagram of an example of a video encoding and decoding system 10 according to an embodiment of this application.

The following describes the embodiments of this application with reference to the accompanying drawings in the embodiments of this application. In the following description, reference is made to the accompanying drawings that form a part of this disclosure and show, by way of illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed description shall not be taken in a limiting sense, and the scope of this application is defined by the appended claims. For example, it should be understood that disclosed content in combination with a described method may also hold true for a corresponding device or system configured to perform the method and vice versa. For example, if one or more specific method steps are described, a corresponding device may include one or more units such as functional units to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as functional units, a corresponding method may include a step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of various example embodiments and/or aspects described in this specification may be combined with each other, unless otherwise specified.

The technical solutions in the embodiments of this application may not only be applied to existing video coding standards (for example, standards such as H.264 and high efficiency video coding (High Efficiency Video Coding, HEVC)), but also be applied to a future video coding standard (for example, the H.266 standard), or may be applied to an audio video coding (Audio Video coding Standard Workgroup of China, AVS) technical standard, for example, AVS3. Terms used in the embodiments of the present invention are merely intended to explain specific embodiments of the present invention, but are not intended to limit the present invention. The following first briefly describes some concepts that may be used in the embodiments of this application.

Video coding typically refers to processing of a sequence of pictures, where the sequence of pictures forms a video or a video sequence. In the video coding field, the terms "picture (picture)", "frame (frame)", and "image (image)" may be used as synonyms. Video coding in this specification refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures (picture), the picture is further split into slices (slice), and the slice is further split into blocks (block). Video coding is performed by block. In some new video coding standards, the concept "block" is further extended. For example, in the H.264 standard, there is a macroblock (macroblock, MB), and the macroblock may be further split into a plurality of prediction blocks (partitions) that can be used for predictive coding. In the high efficiency video coding (high efficiency video coding, HEVC) standard, a plurality of block units are classified based on functions by using basic concepts such as a coding unit (coding unit, CU), a prediction unit (prediction unit, PU), and a transform unit (transform unit, TU), and are described by using a new tree-based structure. For example, in the video coding standard, a frame of picture is partitioned into coding tree units (Coding Tree Unit, CTU) that do not overlap with each other, and then one CTU is split into several child nodes. These child nodes may be split into smaller child nodes based on a quadtree (Quad Tree, QT). A smaller child node may be further split, to form a quadtree structure. If a node is not further split, the node is referred to as a CU. The CU is a basic unit for splitting and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or referred to as picture blocks).

For example, in HEVC, a CTU is partitioned into a plurality of CUs by using a quadtree structure represented as a coding tree. A decision on whether to encode a picture region through inter (temporal) or intra (spatial) prediction is made at a CU level. Each CU may further be partitioned into one, two, or four PUs based on a PU partitioning pattern. In one PU, a same prediction process is applied, and related information is transmitted to a decoder on a PU basis. After a residual block is obtained by applying the prediction process based on the PU split pattern, the CU may be partitioned into TUs based on another quadtree structure similar to the coding tree used for the CU. In the recent development of video compression technologies, a quadtree plus binary tree (Quad-tree and binary tree, QTBT) partition frame is used to partition a coding block. In a QTBT block structure, the CU may be square or rectangular.

In this specification, for ease of description and understanding, a to-be-coded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sample value, or a sample signal in the prediction block. For example, after a plurality of reference blocks are traversed, an optimal reference block is found. The optimal reference block provides prediction for the current block, and this block is referred to as a prediction block.

In a case of lossless video coding, the original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed on a decoder side. To be specific, quality of a reconstructed video picture is lower or poorer than that of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra) prediction and temporal (inter) prediction, the prediction block is subtracted from a current block (a block being processed or to be processed) to obtain a residual block, and the residual block is transformed in the transform domain and quantized to reduce an amount of data that is to be transmitted (compressed). On a decoder side, an inverse processing part relative to an encoder is applied to an encoded block or a compressed block to reconstruct the current block for representation. Furthermore, the encoder duplicates a processing loop of the decoder, so that the encoder and the decoder generate same prediction (for example, intra prediction and inter prediction) and/or reconstruction for processing, that is, for coding a subsequent block.

The following describes a system architecture used in the embodiments of this application. FIG. 1A is a schematic block diagram of an example of a video encoding and decoding system 10 to which the embodiments of this application are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded video data from the source device 12 over the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission lines. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture), for example, a computer graphics processor configured to generate a computer animation picture; or any type of device configured to obtain and/or provide a real-world picture or a computer animation picture (for example, screen content or a virtual reality (virtual reality, VR) picture), and/or any combination thereof (for example, an augmented reality (augmented reality, AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements (picture element). The picture element in the array may also be referred to as a sample. Quantities of samples in horizontal and vertical directions (or axes) of the array or the picture define a size and/or resolution of the picture. For representation of a color, typically three color components are used. To be specific, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (sometimes indicated by L instead) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of this application, a picture transmitted by the picture source 16 to a picture processor may also be referred to as original picture data 17.

The picture preprocessor 18 is configured to receive the original picture data 17 and perform preprocessing on the original picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform each embodiment described below, to implement encoder-side application of the inter prediction method described in this application.

The communications interface 22 may be configured to receive the encoded picture data 21, and transmit the encoded picture data 21 to the destination device 14 or any other device (for example, a memory) over the link 13 for storage or direct reconstruction. The any other device may be any device used for decoding or storage. The communications interface 22 may be, for example, configured to package the encoded picture data 21 in an appropriate format, for example, into a data packet for transmission over the link 13.

The destination device 14 includes a decoder 30. Optionally, the destination device 14 may further include a communications interface 28, a picture postprocessor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 over the link 13 between the source device 12 and the destination device 14 or over any type of network. The link 13 is, for example, a direct wired or wireless connection. The any type of network is, for example, a wired or wireless network or any combination thereof, or any type of private or public network or any combination thereof. The communications interface 28 may be, for example, configured to depackage the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform each embodiment described below, to implement decoder-side application of the video decoding method described in this application.

The picture postprocessor 32 is configured to postprocess the decoded picture data 31 (also referred to as reconstructed picture data) to obtain postprocessed picture data 33. The postprocessing performed by the picture postprocessor 32 may include color format conversion (for example, from a YUV format to an RGB format), color correction, trimming, re-sampling, or any other processing. The picture postprocessor 32 may be further configured to transmit the postprocessed picture data 33 to the display device 34.

The display device 34 is configured to receive the postprocessed picture data 33 to display a picture to, for example, a user or a viewer. The display device 34 may be or may include any type of display for presenting a reconstructed picture, for example, an integrated or external display or monitor. For example, the display may include a liquid crystal display (liquid crystal display, LCD), an organic light emitting diode (organic light-emitting diode, OLED) display, a plasma display, a projector, a micro-LED display, a liquid crystal on silicon (liquid crystal on silicon, LCoS) display, a digital light processor (digital light processor, DLP), or any types of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or a tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combinations thereof. If the technologies are implemented partially by using software, a device may store software instructions in an appropriate non-transitory computer-readable storage medium and may execute the instructions by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode data and store the data into a memory, and/or a video decoding device may retrieve data from the memory and decode the data. In some examples, encoding and decoding are performed by devices that do not communicate with each other but only encode data to a memory and/or retrieve data from the memory and decode the data.

Figure 1B:
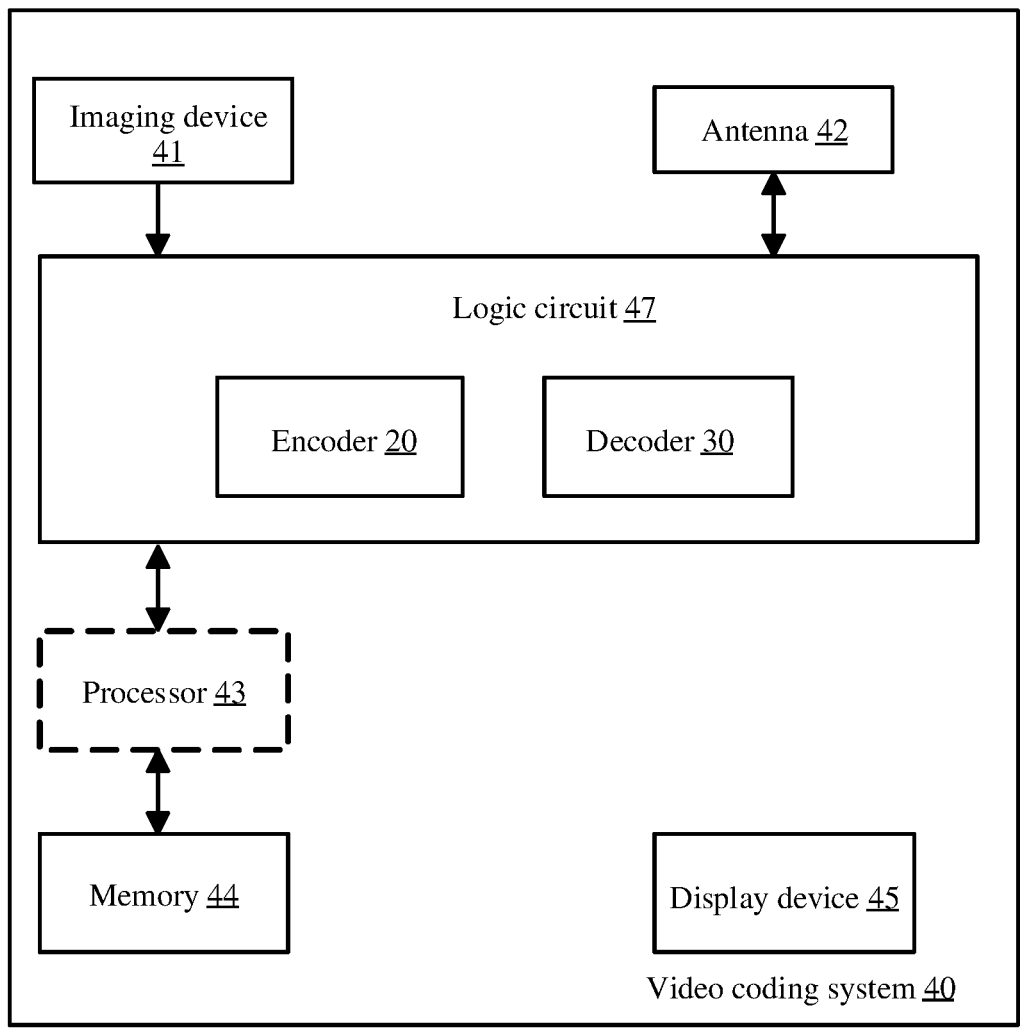
FIG. 1B is a block diagram of an example of a video coding system 40 according to an embodiment of this application.
Figure 2:
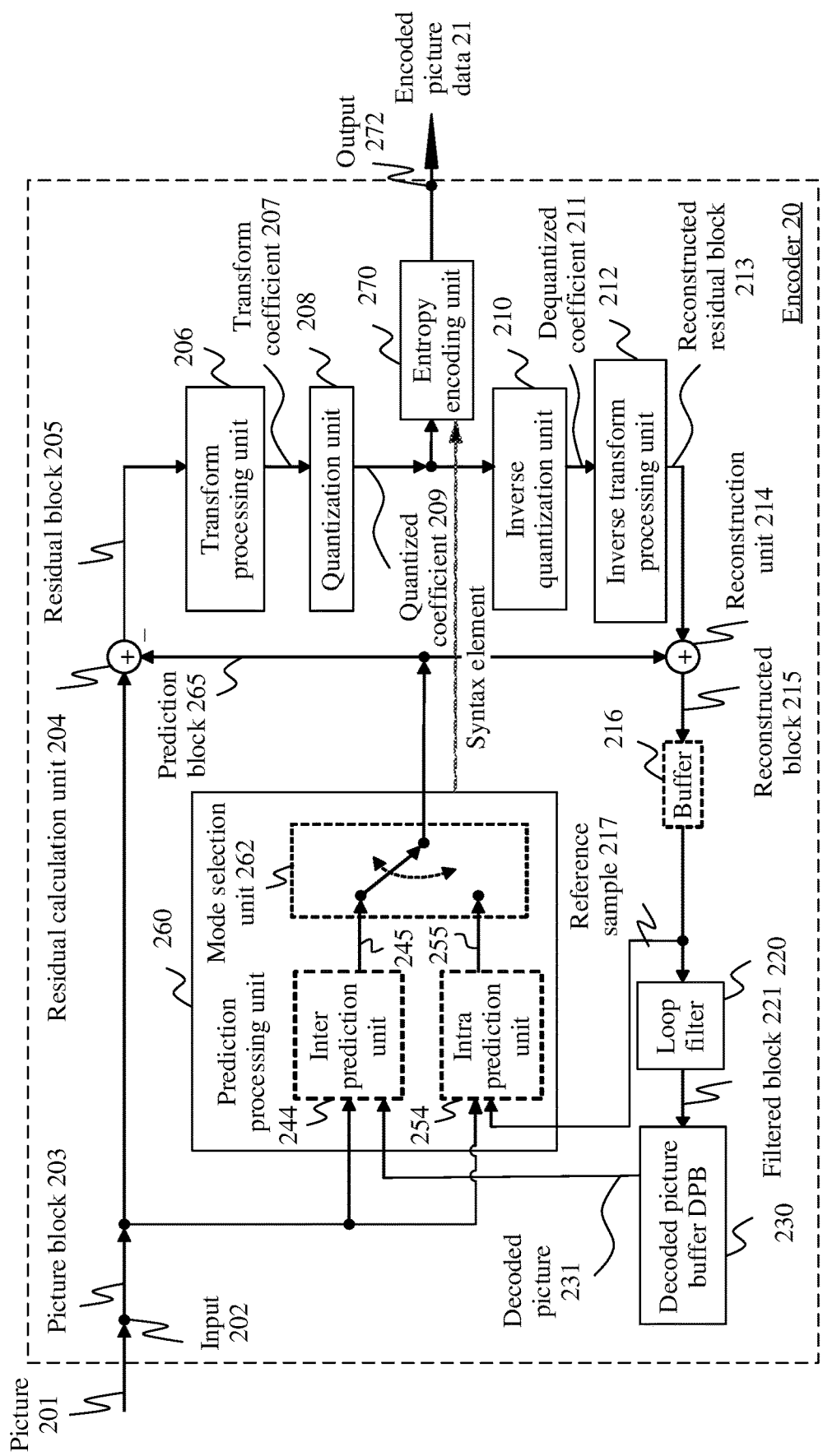
FIG. 2 is a block diagram of an example structure of an encoder 20 according to an embodiment of this application.
Figure 3:
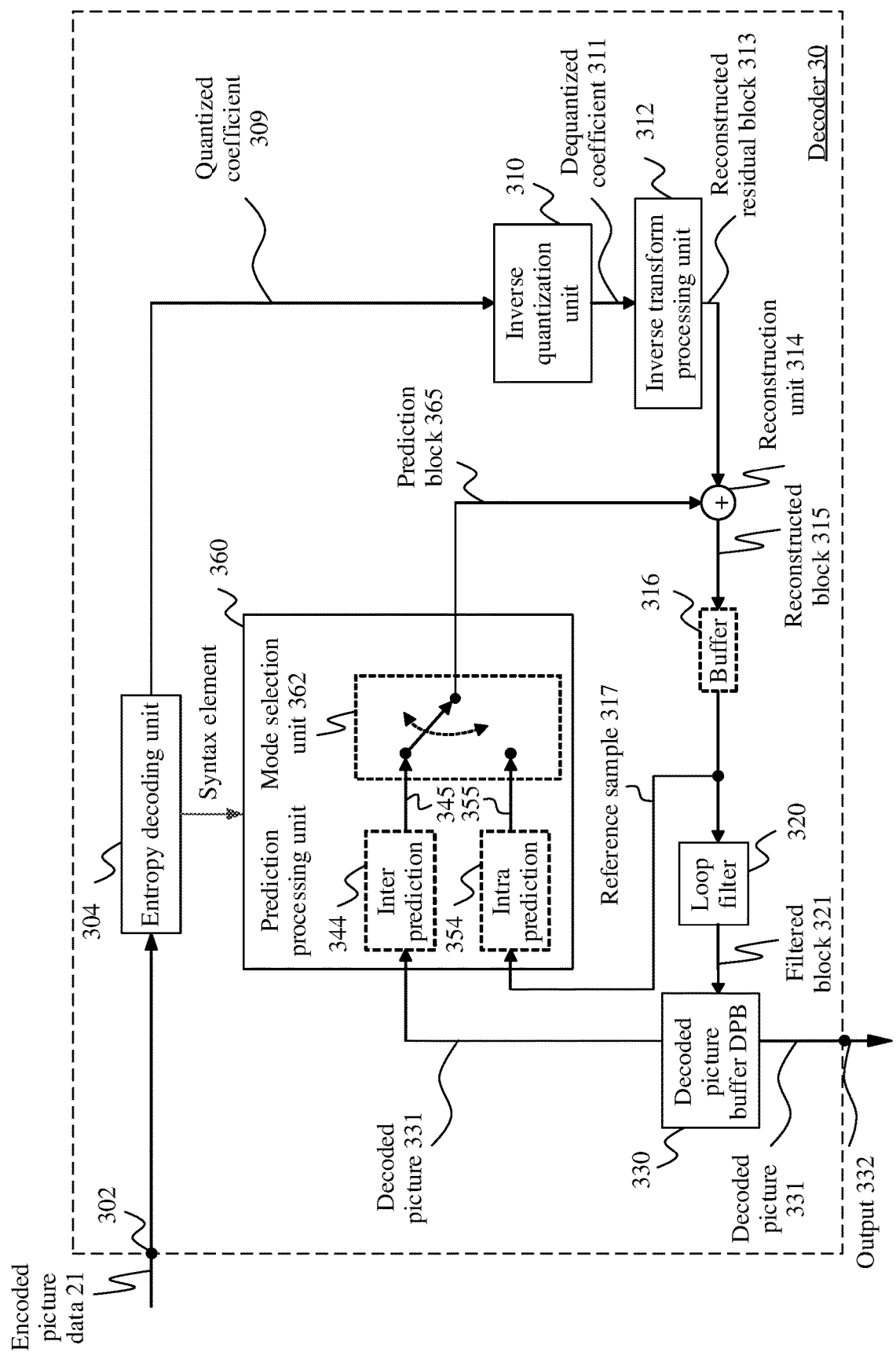
FIG. 3 is a block diagram of an example structure of a decoder 30 according to an embodiment of this application.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of this application. In an illustrated implementation, the video coding system 40 may include an imaging device 41, the encoder 20, the decoder 30 (and/or a video encoder/decoder implemented by a logic circuit 47), an antenna 42, one or more processors 43, one or more memories 44, and/or a display device 45.

As shown in FIG. 1B, the imaging device 41, the antenna 42, the logic circuit 47, the encoder 20, the decoder 30, the processor 43, the memory 44, and/or the display device 45 can communicate with each other. As described, although the video coding system 40 is illustrated with both the encoder 20 and the decoder 30, in different examples, the video coding system 40 may include only the encoder 20 or only the decoder 30.

In some examples, the antenna 42 may be configured to transmit or receive an encoded bitstream of video data. In addition, in some examples, the display device 45 may be configured to present the video data. In some examples, the logic circuit 47 may include application-specific integrated circuit (application-specific integrated circuit, ASIC) logic, a graphics processing unit, a general-purpose processor, or the like. The video coding system 40 may also include the optional processor 43. The optional processor 43 may similarly include application-specific integrated circuit (application-specific integrated circuit, ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (Static Random Access Memory, SRAM) or a dynamic random access memory (Dynamic Random Access Memory, DRAM)), or a nonvolatile memory (for example, a flash memory). In a non-limitative example, the memory 44 may be implemented as a cache memory. In some examples, the logic circuit 47 may access the memory 44 (for example, for implementing a picture buffer). In other examples, the logic circuit 47 may include a memory (for example, a cache) for implementing a picture buffer.

In some examples, the encoder 20 implemented by using the logic circuit may include a picture buffer (which is implemented by using, for example, the memory 44) and a graphics processing unit. The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by using, for example, a processing unit 43 or the memory 44) and a graphics processing unit. The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, and the like related to video frame encoding described in this specification, for example, data related to coding partitioning (for example, a transform coefficient or a quantized transform coefficient, an optional indicator (as described), and/or data that defines the coding partitioning). The video coding system 40 may further include the decoder 30 coupled to the antenna 42 and configured to decode the encoded bitstream. The display device 45 is configured to present a video frame.

It should be understood that, in this embodiment of this application, relative to the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy encode the syntax element into an encoded video bitstream. In such examples, the decoder 30 may parse the syntax element and correspondingly decode the related video data.

It should be noted that the method described in the embodiments of this application is mainly used in an inter prediction process. This process is performed by both the encoder 20 and the decoder 30. The encoder 20 and the decoder 30 in the embodiments of this application may be, for example, an encoder/a decoder corresponding to a video standard protocol such as H.263, H.264, HEVV, MPEG-2, MPEG-4, VP8, or VP9, or a next-generation video standard protocol (such as H.266).

FIG. 2 is a schematic/conceptual block diagram of an example of an encoder 20 according to an embodiment of this application. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter unit 220, the decoded picture buffer (decoded picture buffer, DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (discrete cosine transform, DCT) or a discrete sine transform (discrete sine transform, DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scaling factor is usually selected based on some constraints. For example, the scaling factor is a power of two for a shift operation, a bit depth of the transform coefficient, and a tradeoff between accuracy and implementation costs. For example, a specific scaling factor is specified for the inverse transform by, for example, the inverse transform processing unit 212 on the decoder side 30 (and a corresponding inverse transform by, for example, the inverse transform processing unit 212 on the encoder 20 side), and correspondingly, a corresponding scaling factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (quantization parameter, QP). For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step), or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization applied by quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (discrete cosine transform, DCT) or an inverse discrete sine transform (discrete sine transform, DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters including, for example, a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 220 is shown as an in-loop filter in FIG. 2, in other configurations, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (decoded picture buffer, DPB) 230 may be a reference picture memory that stores reference picture data for use in encoding video data by the encoder 20. The DPB 230 may be formed by any one of a variety of storage devices such as a dynamic random access memory (dynamic random access memory, DRAM) (including a synchronous DRAM (synchronous DRAM, SDRAM), a magnetoresistive RAM (magnetoresistive RAM, MRAM), and a resistive RAM (resistive RAM, RRAM)), or another type of storage device. The DPB 230 and the buffer 216 may be provided by a same storage device or separate storage devices. In an example, the decoded picture buffer (decoded picture buffer, DPB) 230 is configured to store the filtered block 221. The decoded picture buffer 230 may be further configured to store another previously filtered block, for example, a previously reconstructed and filtered block 221, of the same current picture or of a different picture, for example, a previously reconstructed picture, and may provide a complete previously reconstructed, that is, decoded, picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (decoded picture buffer, DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (rate-distortion optimization, RDO), that is, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DBP 230, as described above) and other inter prediction parameters, for example, depends on whether the entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (Advanced Motion Vector Prediction, AMVP) mode and a merge (merge) mode. In specific implementation, the set of inter prediction modes may include an improved control point-based AMVP mode and an improved control point-based merge mode in the embodiments of this application. In an example, the intra prediction unit 254 may be configured to perform any combination of inter prediction technologies described below.

In addition to the foregoing prediction modes, a skip mode and/or a direct mode may also be used in the embodiments of this application.

The prediction processing unit 260 may be further configured to partition the picture block 203 into smaller block partitions or subblocks, for example, by iteratively using quadtree (quad-tree, QT) partitioning, binary tree (binary-tree, BT) partitioning, ternary tree (triple-tree, TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (motion estimation, ME) unit (not shown in FIG. 2) and a motion compensation (motion compensation, MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 31, or in other words, the current picture and the previously decoded pictures 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. The offset is also referred to as a motion vector (motion vector, MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to encode a picture block. Upon receiving a motion vector for a PU of the current picture block, a motion compensation unit 246 may locate a prediction block to which the motion vector points in a reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Specifically, the intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or not apply) an entropy encoding algorithm or scheme (for example, a variable-length coding (variable length coding, VLC) scheme, a context adaptive VLC (context adaptive VLC, CAVLC) scheme, an arithmetic coding scheme, context adaptive binary arithmetic coding (context adaptive binary arithmetic coding, CABAC), syntax-based context-adaptive binary arithmetic coding (syntax-based context-adaptive binary arithmetic coding, SBAC), probability interval partitioning entropy (probability interval partitioning entropy, PIPE) coding, or another entropy encoding methodology or technology) to one or all of the quantized residual coefficient 209, the inter prediction parameter, the intra prediction parameter, and/or the loop filter parameter, to obtain encoded picture data 21 that may be output via an output 272, for example, in a form of an encoded bitstream 21. The encoded bitstream may be transmitted to the video decoder 30, or archived for later transmission or retrieval by the video decoder 30. The entropy encoding unit 270 may be further configured to entropy-encode another syntax element for a current video slice that is being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Specifically, in this embodiment of this application, the encoder 20 can be configured to implement the inter prediction method described in the following embodiments.

It should be understood that another structural variant of the video encoder 20 may be used to encode a video stream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional. In addition, in a case of lossless compression encoding, the transform processing unit 206, the quantization unit 208, the inverse quantization unit 210, and the inverse transform processing unit 212 are optional. It should be understood that in different application scenarios, the inter prediction unit 244 and intra prediction unit 254 may be used selectively.

FIG. 3 is a schematic/conceptual block diagram of an example of a decoder 30 configured to implement an embodiment of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) of the prediction processing unit 360 is configured to generate the prediction block 365 for a video block of the current video slice based on a motion vector and the another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate the prediction block for the current video block being decoded. In an example of this application, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector of each inter encoded video block for the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice to determine a quantization degree that should be applied and an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (sample-adaptive offset, SAO) filter, or another filter, for example, a bilateral filter, an adaptive loop filter (adaptive loop filter, ALF), a sharpening or smoothing filter, or a collaborative filter. Although the loop filter unit 320 is shown as an in-loop filter in FIG. 3, in another configuration, the loop filter unit 320 may be implemented as a post-loop filter.

Then, a decoded video block 321 in a given frame or picture is stored in the decoded picture buffer 330 that stores a reference picture used for subsequent motion compensation.

The decoder 30 is configured to, for example, output the decoded picture 31 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Specifically, in this embodiment of this application, the decoder 30 is configured to implement the inter prediction method described in the following embodiments.

It should be understood that another structural variant of the video decoder 30 can be used to decode the encoded video bitstream. For example, the video decoder 30 may generate an output video stream without processing by the filter 320. Alternatively, for some picture blocks or picture frames, the entropy decoding unit 304 of the video decoder 30 does not obtain quantized coefficients through decoding, and correspondingly, there is no need for the inverse quantization unit 310 and the inverse transform processing unit 312 to perform processing. The loop filter 320 is optional. In addition, in a case of lossless compression, the inverse quantization unit 310 and the inverse transform processing unit 312 are also optional. It should be understood that, in different application scenarios, the inter prediction unit and the intra prediction unit may be used selectively.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit width of the motion vector is bitDepth, a range of the motion vector is $-2^{bitDepth-1} \sim 2^{bitDepth-1}-1$. If bitDepth is 16, the value ranges from −32768 to 32767. If bitDepth is 18, the value ranges from −131072 to 131071. For another example, the value of the motion vector (for example, motion vectors MVs of four 4×4 subblocks in one 8×8 picture block) is constrained, so that a maximum difference between integer parts of the MVs of the four 4×4 subblocks does not exceed N pixels, for example, does not exceed one pixel.

Figure 4:
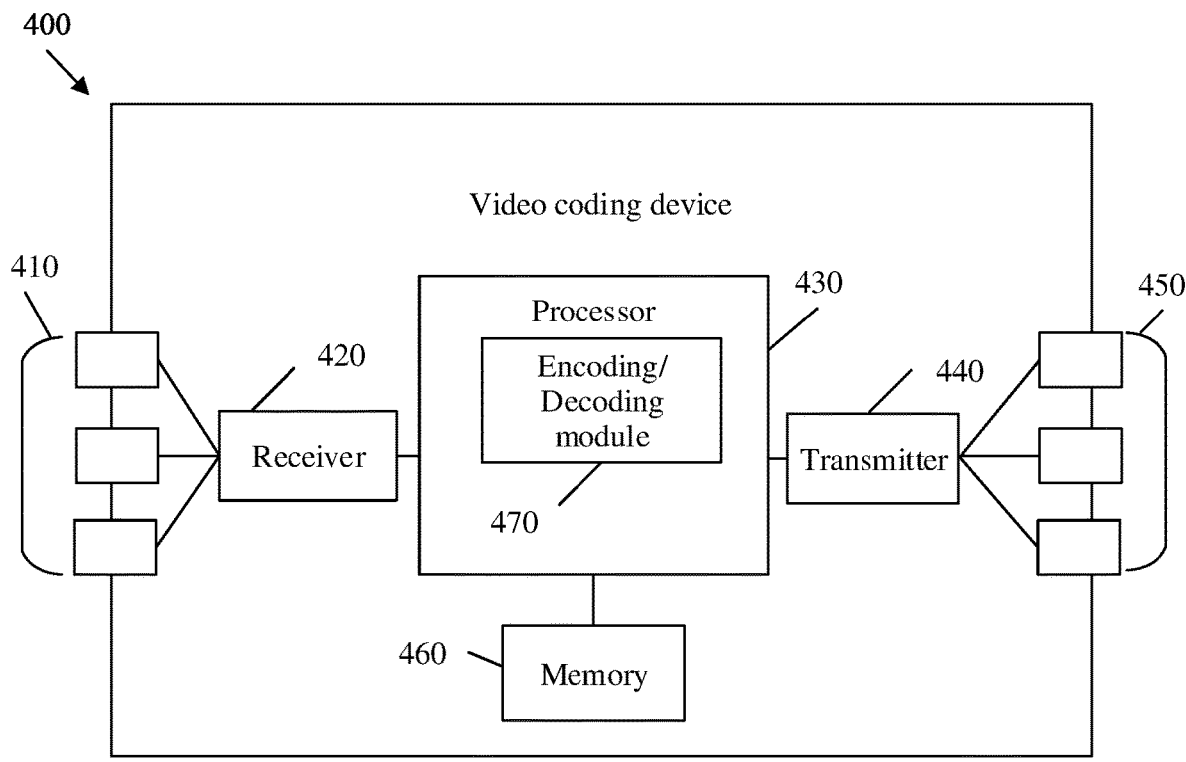
FIG. 4 is a block diagram of an example of a video coding device 400 according to an embodiment of this application.

FIG. 4 is a schematic structural diagram of a video coding device 400 (for example, a video encoding device 400 or a video decoding device 400) according to an embodiment of this application. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A).

In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the inter prediction method provided in the embodiments of this application. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (ternary content-addressable memory, TCAM), and/or a static random access memory (SRAM).

Figure 5:
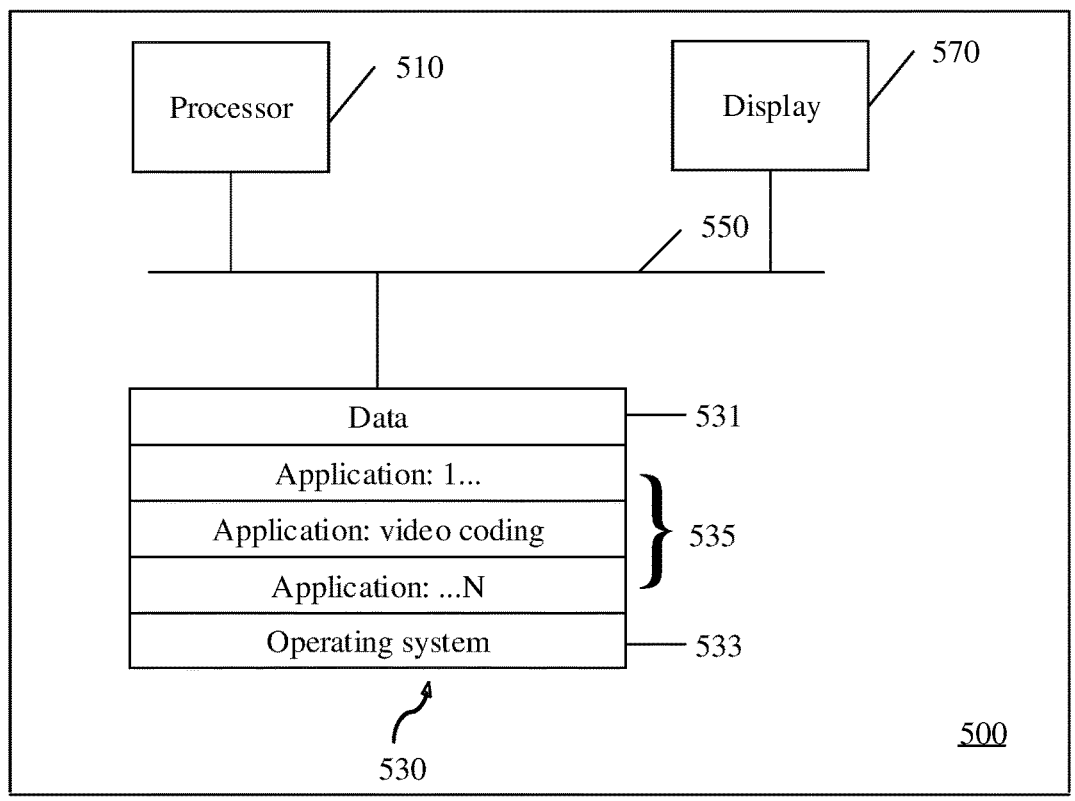
FIG. 5 is a block diagram of another example of an encoding apparatus or a decoding apparatus according to an embodiment of this application.

FIG. 5 is simplified block diagram of an apparatus 500 that may be used as either or both of the source device 12 and the destination device 14 in FIG. 1A according to an example embodiment. The apparatus 500 may implement the technologies of this application. In other words, FIG. 5 is a schematic block diagram of an implementation of an encoding device or a decoding device (coding device 500 for short) according to an embodiment of this application. The coding device 500 may include a processor 510, a memory 530, and a bus system 550. The processor and the memory are connected through the bus system. The memory is configured to store an instruction. The processor is configured to execute the instruction stored in the memory. The memory of the coding device stores program code, and the processor may invoke the program code stored in the memory, to perform various video encoding or decoding methods described in this application. To avoid repetition, details are not described herein.

In this embodiment of this application, the processor 510 may be a central processing unit (Central Processing Unit, "CPU" for short), or the processor 510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, any conventional processor, or the like.

The memory 530 may include a read-only memory (ROM) device or a random access memory (RAM) device. Any other storage device of an appropriate type may alternatively be used as the memory 530. The memory 530 may include code and data 531 accessed by the processor 510 through the bus 550. The memory 530 may further include an operating system 533 and an application program 535. The application program 535 includes at least one program that allows the processor 510 to perform the video encoding or decoding method (in particular, the inter prediction method described in this application) described in this application. For example, the application program 535 may include applications 1 to N, and further include a video encoding or decoding application (referred to as a video coding application for short) that performs the video encoding or decoding method described in this application.

In addition to a data bus, the bus system 550 may further include a power bus, a control bus, a status signal bus, and the like. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

FIG. 6(a) to FIG. 6(e) show a quadtree split mode, a binary tree split mode, and an extended quadtree split mode.

Figure 6A:
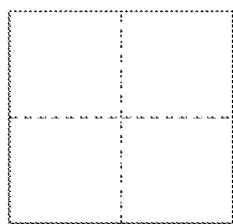
FIG. 6(a) to FIG. 6(e) are a schematic diagram of a binary tree split mode, a quadtree split mode, and an extended quadtree split mode according to an embodiment of this application.

The QT is a tree structure, and indicates that one node can be split into four child nodes. In an existing video coding standard, a quadtree-based CTU split mode is used. In the quadtree-based CTU split mode, a CTU is used as a root node, and each node corresponds to one square region; and a node may not be split (in this case, a region corresponding to the node is a CU), or the node is split into four lower-level nodes, to be specific, the square region is split into four equal-sized square regions (the length and the width of each of the four equal-sized square regions are half of the length and the width of the square region before the split), and each region corresponds to one node, as shown in FIG. 6(a).

Figure 6B:
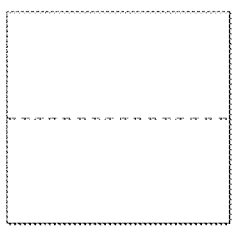
Figure 6C:
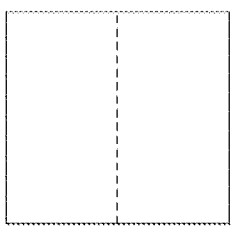

The binary tree is a tree structure, and indicates that one node can be split into two child nodes. In an existing coding method in which the binary tree is used, a node on a binary tree structure may not be split, or the node is split into two lower-level nodes. There are two modes of splitting the node into two nodes: (1) Horizontal binary tree split: A region corresponding to the node is split into two equal-sized regions: an upper region and a lower region, and each region corresponds to one node, as shown in FIG. 6(b). (2) Vertical binary tree split: A region corresponding to the node is split into two equal-sized regions: a left region and a right region, and each region corresponds to one node, as shown in FIG. 6(c).

An extended quadtree (Extended Quad-Tree, EQT) is an H-shaped split structure, and one node can be split into four child nodes. There are two modes of splitting the node into four nodes: (1) Horizontal quadtree split: A region corresponding to the node is split into four regions: an upper region, a middle left region, a middle right region, and a lower region, and each region corresponds to one node, where heights of the upper region, the middle left region, the middle right region, and the lower region are respectively ¼, ½, ½, and ¼ of a height of the node, and widths of the middle left region and the middle right region are respectively ½ and ½ of a width of the node, as shown in FIG. 6(*d*). (2) Vertical quadtree split: A region corresponding to the node is split into four regions: a left region, a middle upper region, a middle lower region, and a right region, and each region corresponds to one node, where widths of the left region, the middle upper region, the middle lower region, and the right region are respectively ¼, ½, ½, and ¼ of a width of the node, and heights of the middle upper region and the middle lower region are respectively ½ and ½ of a height of the node, as shown in FIG. 6(*e*). In an existing coding method in which the extended quadtree is used, a node on an extended quadtree structure may not be split, or the node continues to be split into lower-level nodes by using a BT or an EQT.

In the H.265 video coding standard, a frame of picture is partitioned into non-overlapping coding tree units (CTU). A CTU size may be set to 64×64 (the CTU size may alternatively be set to another value, for example, the CTU size in JVET reference software JEM is increased to 128×128 or 256×256). A 64×64 CTU includes a rectangular pixel matrix with 64 columns and 64 pixels per column, and each pixel includes a luminance component or/and a chrominance component.

The quadtree (quad-tree, QT for short)-based CTU split mode is used. A CTU is used as a root (root) node of a quadtree, and the CTU is recursively split into several leaf nodes (leaf node) in the quadtree split mode. One node corresponds to one picture region. If a node is not split, the node is referred to as a leaf node, and a picture region corresponding to the node becomes a CU. If a node is further split, a picture region corresponding to the node is split into four equal—sized regions (a length and a width of each of the four regions are respectively half of a length and a width of the split region), and each region corresponds to one node. Whether these nodes are further split needs to be separately determined. Whether a node is to be split is indicated by a split flag split_cu_flag that is in a bitstream and that corresponds to the node. A node A is split into four nodes Bi, where i=0, 1, 2, or 3. Bi is referred to as a child node of A, and A is referred to as a parent node of Bi. A quadtree depth (qtDepth) of the root node is 0. A quadtree depth of a node is a quadtree depth of a parent node of the node plus 1. For brevity of description, in the following, a size and a shape of a node are a size and a shape of a picture region corresponding to the node.

More specifically, for a 64×64 CTU node (whose quadtree depth is 0), based on split_cu_flag corresponding to the CTU node, split may not be performed and the CTU node may become a 64×64 CU, or the CTU node is split into four 32×32 nodes (whose quadtree depths are 1). Each of the four 32×32 nodes may further be split or not split based on split_cu_flag corresponding to the node. If a 32×32 node is further split, four 16×16 nodes (whose quadtree depths are 2) are generated. The rest may be deduced by analogy, until no node is further split. In this way, one CTU is split into one group of CUs. A minimum size (size) of the CU is identified in a sequence parameter set (Sequence Parameter Set, SPS). For example, an 8×8 CU is a minimum CU. In the foregoing recursive split process, if a size of a node is equal to the minimum CU size (minimum CU size), the node is not further split by default, and a split flag of the node does not need to be included in the bitstream.

After a leaf node is obtained by parsing a node, the leaf node is a CU, coding information (including information such as a prediction mode and a transform coefficient of the CU, for example, a coding_unit( ) syntax structure in H.265) corresponding to the CU is further parsed. Then, decoding processing such as prediction, dequantization, inverse transform, and loop filtering is performed on the CU based on the coding information, to generate a reconstructed picture corresponding to the CU. The quadtree structure enables the CTU to be split into a group of CUs of appropriate sizes based on a local picture feature. For example, a flat region is split into relatively large CUs, and a region with rich textures is split into relatively small CUs.

A mode of splitting a CTU into a group of CUs corresponds to a coding tree (coding tree). A coding tree to be used for the CTU is usually determined by using a rate-distortion optimization (rate distortion optimization, RDO) technology of an encoder. The encoder attempts to use a plurality of CTU split modes, and each split mode corresponds to one rate-distortion cost (RD cost). The encoder compares RD costs of all used split modes, and finds a split mode with a minimum RD cost to serve as an optimal CTU split mode for actual coding of the CTU. All the CTU split modes used by the encoder need to meet a split rule specified by a decoder, so that the CTU split modes can be correctly identified by the decoder.

Based on the quadtree split, a binary tree (binary tree, BT) split mode and a ternary tree (ternary tree, TT) split mode are added to versatile video coding test model (Versatile video coding Test Model, VTM) reference software. The VTM is a new codec reference software developed by the JVET.

The binary tree split is to split a node into two child nodes. There are two specific binary tree split modes:

(1) Horizontal binary tree split: A region corresponding to the node is split into two equal-sized regions: an upper region and a lower region (to be specific, widths remain unchanged, and heights are a half of a height of the region before the split), and each region corresponds to one node, as shown in FIG. 6(*b*).

(2) Vertical binary tree split: A region corresponding to the node is split into two equal-sized regions: a left region and a right region (to be specific, heights remain unchanged, and widths are a half of a width of the region before the split), as shown in FIG. 6(*c*).

The ternary tree split is to split a node into three child nodes. There are two specific ternary tree split modes:

(1) Horizontal ternary tree split: A region corresponding to the node is split into three regions: an upper region, a middle region, and a lower region, and each region corresponds to one node, where heights of the upper region, the middle region, and the lower region are respectively ¼, ½, and ¼ of a height of the node, as shown in FIG. 6(*d*).

(2) Vertical ternary tree split: A region corresponding to the node is split into three regions: a left region, a middle region, and a right region, and each region corresponds to one node, where widths of the left region, the middle region, and the right region are respectively ¼, ½, and ¼ of a height of the node, as shown in FIG. 6(*e*).

In the VTM, a quadtree plus multi-type tree (Quad Tree plus Multi-Type Tree, QT-MTT) split mode is used. More specifically, the CTU is split by using the QT, to generate a QT leaf node. A node in the QT may further be split into four QT child nodes by using the quadtree split, or one QT leaf node is generated without using the quadtree split. A QT leaf node functions as a root node of an MTT. A node in the MTT may be split into child nodes by using one of the four split modes: the horizontal binary tree split, the vertical binary tree split, the horizontal ternary tree split, and the vertical ternary tree split, or becomes an MTT leaf node without being further split. A leaf node of the MTT is a coding unit CU.

Figures 7A, 7B:
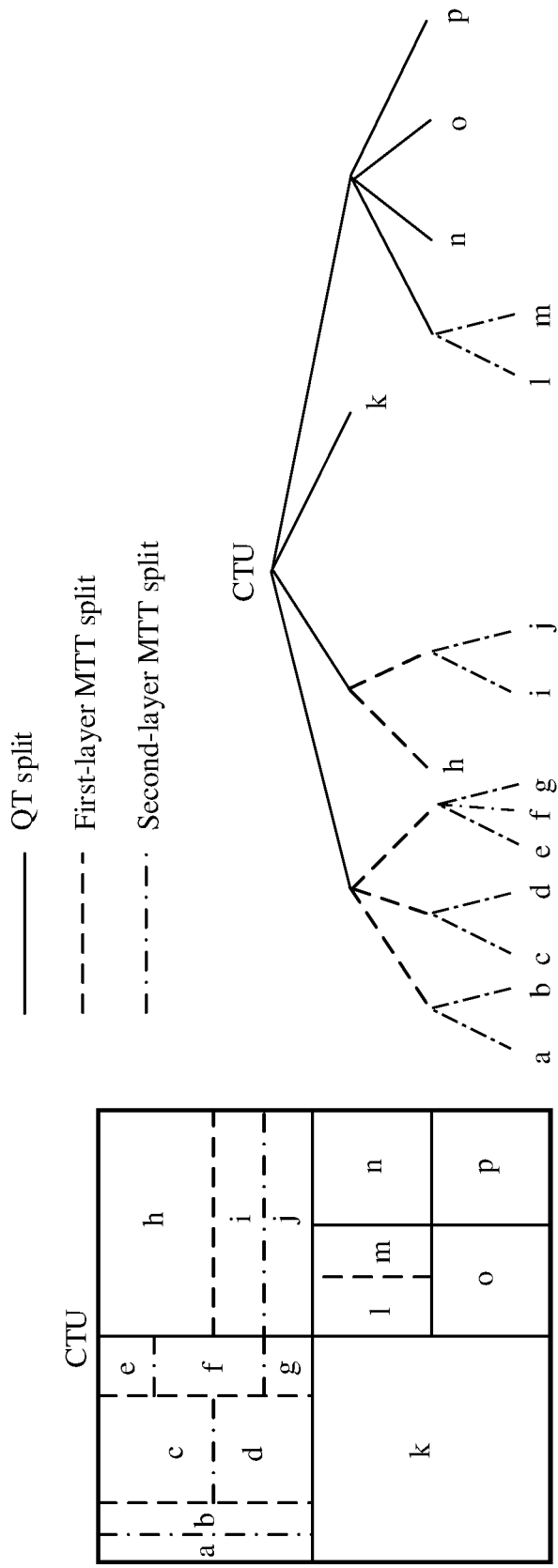
FIG. 7(a) and FIG. 7(b) are a schematic diagram of a QT-MTT split according to an embodiment of this application.

FIG. 7(a) and FIG. 7(b) show an example in which a CTU is split into 16 CUs from a to p by using a QT-MTT. In FIG. 7(b), each endpoint represents one node. Four lines connected to one node indicate a quadtree split, two lines connected to one node indicate a binary tree split, and three lines connected to one node indicate a ternary tree split. A solid line indicates a QT split, a dashed line indicates a first-layer multi-type tree (Multi-Type Tree, MTT) split, and a dot-dashed line indicates a second-layer MTT split. Herein, a to p are 16 MTT leaf nodes, and each MTT leaf node is one CU. A CU split diagram shown in FIG. 7(a) is obtained for a CTU by using a split mode shown in FIG. 7(b).

In the QT-MTT split mode, each CU has a QT depth (Quad-tree depth, QT depth, also referred to as a QT depth) and an MTT depth (Multi-Type Tree depth, MTT depth, also referred to as an MTT depth). The QT depth indicates a QT depth of a QT leaf node to which the CU belongs, and the MTT depth indicates an MTT depth of an MTT leaf node to which the CU belongs. For a root node of a coding tree, a QT depth is 0 and an MTT depth is 0. If the QT split is used for a node on the coding tree, a QT depth of a child node obtained through split is a QT depth of the node plus 1, and an MTT depth remains unchanged. Similarly, if the MTT split (namely, one of the BT split or the TT split) is used for a node on the coding tree, an MTT depth of a child node obtained through split is an MTT depth of the node plus 1, and a QT depth remains unchanged. For example, in FIG. 7(a) and FIG. 7(b), QT depths of a, b, c, d, e, f, g, i, and j are 1, and MTT depths of a, b, c, d, e, f, g, i, and j are 2; a QT depth of h is 1, and an MTT depth of h is 1; QT depths of n, o, and p are 2, and MTT depths of n, o, and p are 0; and QT depths of l and m are 2, and MTT depths of l and m are 1. If the CTU is split into only one CU, a QT depth of the CU is 0, and an MTT depth is 0.

In a process of formulating the latest AVS3, based on the quadtree split, a binary tree (binary tree, BT) split mode and an extended quadtree (Extended Quad-Tree, EQT) split mode are added to the AVS3.

The binary tree split is to split a node into two child nodes. There are two specific binary tree split modes:
 (1) Horizontal binary tree (horizontal binary tree, HBT) split: A region corresponding to the node is split into two equal-sized regions: an upper region and a lower region (to be specific, widths remain unchanged, and heights are a half of a height of the region before the split), and each region corresponds to one node, as shown in FIG. 6(b).
 (2) Vertical binary tree (vertical binary tree, VBT) split: A region corresponding to the node is split into two equal-sized regions: a left region and a right region (to be specific, heights remain unchanged, and widths are a half of a width of the region before the split), as shown in FIG. 6(c).

Figure 6D:
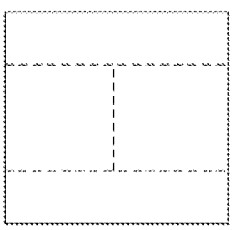
Figure 6E:
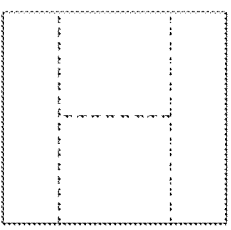

The extended quadtree split is to split a node into four child nodes. There are two specific extended quadtree split modes:
 (1) Horizontal extended quadtree (horizontal Extended Quad-Tree, HEQT) split: A region corresponding to the node is split into four regions: an upper region, a middle left region, a middle right region, and a lower region, and each region corresponds to one node, where heights of the upper region, the middle left region, the middle right region, and the lower region are respectively $1/4$, $1/2$, $1/2$, and $1/4$ of a height of the node, and widths of the middle left region and the middle right region are respectively $1/2$ and $1/2$ of a width of the node, as shown in FIG. 6(d).
 (2) Vertical extended quadtree (vertical Extended Quad-Tree, VEQT) split: A region corresponding to the node is split into four regions: a left region, a middle upper region, a middle lower region, and a right region, and each region corresponds to one node, where widths of the left region, the middle upper region, the middle lower region, and the right region are respectively $1/4$, $1/2$, $1/2$, and $1/4$ of a width of the node, and heights of the middle upper region and the middle lower region are respectively $1/2$ and $1/2$ of a height of the node, as shown in FIG. 6(e).

In the AVS, a quadtree plus multi-type tree split mode is used. To be specific, a node on a first-level coding tree can be split into subnodes only by using the QT, and a leaf node on the first-level coding tree is a root node of a second-level coding tree; and a node on the second-level coding tree may be split into subnodes by using one of the BT or EQT split modes, and a leaf node on the second-level coding tree is a coding unit. It should be noted that, when a leaf node is obtained in the BT or EQT split mode, the leaf node can be obtained only in the BT or EQT split mode, and cannot be obtained in the QT mode.

After the foregoing split, a picture block at a location of the leaf node on the coding tree is used as a coding unit. Video coding mainly includes intra prediction (Intra Prediction), inter prediction (Inter Prediction), transform (Transform), quantization (Quantization), entropy encoding (Entropy encode), in-loop filtering (in-loop filtering) (mainly de-blocking filtering), and the like. After a picture is split into coding blocks, intra prediction or inter prediction is performed. Then transform and quantization are performed after a residual is obtained. Finally, entropy encoding is performed and a bitstream is output. Herein, a coding block is an M×N array including pixels (M may be equal to N, or may not be equal to N). In addition, a pixel value of each pixel location is known.

Intra prediction means predicting a pixel value of a pixel in a current coding block by using a pixel value of a pixel in a reconstructed region in a current picture.

Inter prediction means searching a reconstructed picture for a matched reference block for a current coding block in a current picture, to obtain motion information of the current coding block, and then calculating prediction information or a predictor of a pixel value of a pixel in the current coding block based on the motion information (information and a value are not distinguished in the following). A process of calculating motion information is referred to as motion estimation (Motion estimation, ME), and a process of calculating a predictor of a pixel value of a pixel in a current coding block is referred to as motion compensation (Motion compensation, MC).

It should be noted that the motion information of the current coding block includes prediction direction indication information (generally forward prediction, backward prediction, or bidirectional prediction), one or two motion vectors (Motion vector, MV) pointing to a reference block, and indication information (generally marked as a reference index, Reference index) of a picture in which the reference block is located.

Forward prediction means selecting a reference picture from a forward reference picture set, to obtain a reference block for a current coding block. Backward prediction means selecting a reference picture from a backward reference picture set, to obtain a reference block for a current coding block. Bidirectional prediction means selecting a reference picture from each of a forward reference picture set and a backward reference picture set, to obtain reference blocks. When the bidirectional prediction method is used, the current coding block has two reference blocks. Each reference block requires a motion vector and a reference index for an indication. Then, a predictor of a pixel value of a pixel in a current block is determined according to pixel values of pixels in the two reference blocks.

In a motion estimation process, the current coding block needs to try a plurality of reference blocks in the reference picture, and which reference block or blocks are finally used for prediction is determined through rate-distortion optimization (rate-distortion optimization, RDO) or other methods.

After the prediction information is obtained through intra prediction or inter prediction, residual information is obtained by subtracting the corresponding prediction information from the pixel value of the pixel in the current coding block. Then the residual information is transformed by using a method such as discrete cosine transform (discrete cosine transformation, DCT). Then, a bitstream is obtained through quantization and entropy encoding. After a predicted signal is added with a reconstructed residual signal, a filtering operation needs to be performed, to obtain a reconstructed signal. The reconstructed signal is used as a reference signal for subsequent encoding.

Decoding is an inverse process of encoding. For example, residual information is first obtained through entropy decoding, inverse quantization, and inverse transform, and a bitstream is decoded to determine whether intra prediction or inter prediction is used for a current coding block. If intra prediction is used, prediction information is constructed based on pixel values of pixels in a reconstructed region around the current coding block by using the intra prediction method. If inter prediction is used, motion information needs to be obtained through parsing, a reference block is determined in the reconstructed picture based on the obtained motion information, and pixel values of pixels in the block are used as the prediction information. This process is referred to as motion compensation (Motion compensation, MC). After the prediction information and the residual information are superposed, a filtering operation is performed to obtain reconstructed information.

The following embodiment is a process of determining a prediction mode for a current picture block based on a bitstream of the current picture block.

Figure 8:
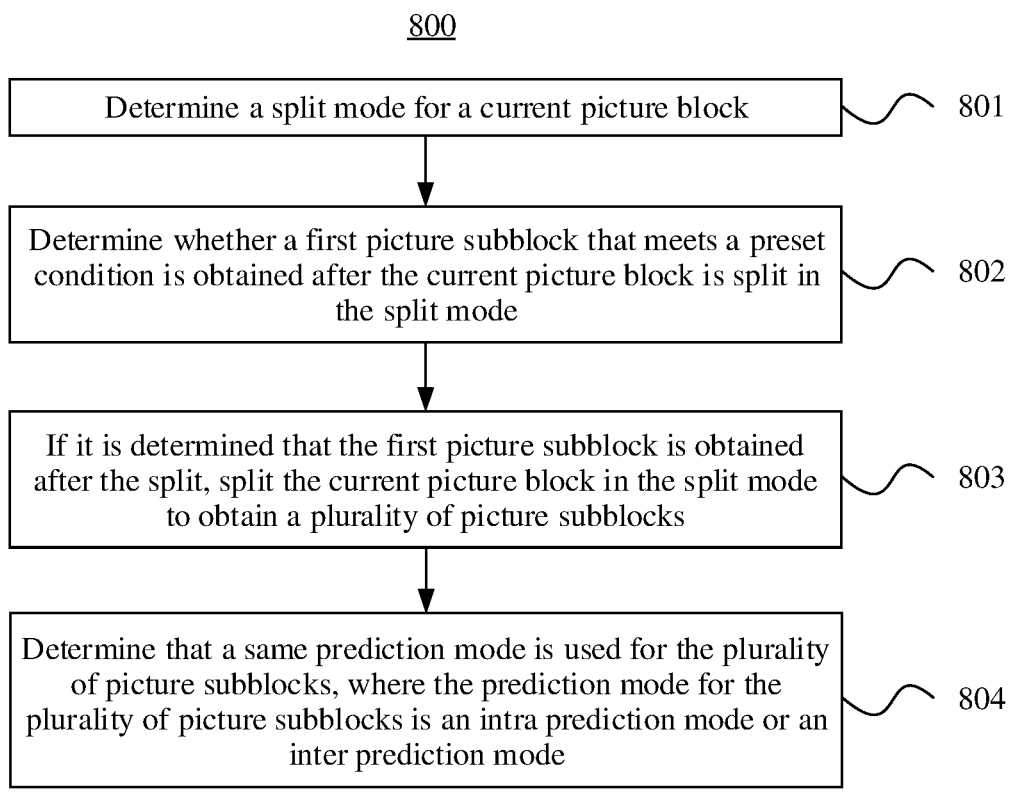
FIG. 8 is a flowchart of a prediction mode determining method according to an embodiment of this application.

FIG. 8 is a flowchart of a prediction mode determining method according to an embodiment of this application. The process 800 may be performed by the video encoder 20 or the video decoder 30. The process 800 is described as a series of steps or operations. It should be understood that the steps or operations of the process 800 may be performed in various sequences and/or may be performed simultaneously, and are not limited to an execution sequence shown in FIG. 8. As shown in FIG. 8, the method includes the following steps.

Step 801: Determine a split mode for a current picture block.

The split mode for the current picture block may be a QT split mode, a BT split mode, an EQT split mode, or another split mode. This is not limited in this application. The split mode for the current picture block is usually carried in a bitstream for transmission after encoding is performed, and the split mode for the current picture block may be obtained by parsing a corresponding syntax element in the bitstream.

It should be noted that the current picture block may not need to be further split. In this case, the current picture block is processed as a coding unit.

Step 802: Determine whether a first picture subblock that meets a preset condition is obtained after the current picture block is split in the split mode.

In this application, the preset condition may include that an area of the first picture subblock is less than or equal to a specified threshold. That is, in this step, determining may be performed based on an area of the current picture block. To be specific, if the area of the current picture block meets the following condition, it is determined that the first picture subblock is obtained after the split: when the split mode is a binary tree BT split mode, sizeC/2 is less than S, where sizeC is the area of the current picture block, and S is a preset area threshold; or when the split mode is a quadtree QT split mode, sizeC/4 is less than S; or when the split mode is an extended quadtree EQT split mode, sizeC/4 is less than S.

In this application, whether the first picture subblock whose area is less than the specified threshold is obtained after the current picture block is split needs to be determined in advance. In this case, an area of each picture subblock obtained after the split may be known in advance according to the split mode obtained in step 801. If the BT split mode is used, the current picture block is split into two picture subblocks, and therefore it is determined whether sizeC/2 is less than S. If the QT split mode is used, the current picture block is split into four picture subblocks, and therefore it is determined whether sizeC/4 is less than S. If the EQT split mode is used, the current picture block is split into four picture subblocks, and therefore it is determined whether sizeC/4 is less than S.

In addition, in this application, areas of a plurality of picture subblocks obtained after the split may be separately compared with a specified threshold. If an area of one or more of the picture subblocks is less than the specified threshold, it may be determined that the first picture subblock is obtained after the split, and the picture subblock whose area is less than the specified threshold is the first picture subblock. It should be noted that, in this application, a plurality of methods may be used to determine whether the first picture subblock is obtained after the picture block is split. This is not specifically limited.

For example, assuming that a width of the current picture block is W and a height of the current picture block is H, the area of the current picture block is as follows: sizeC=W×H, and S may be set to 64 or 32.

Step 803: If it is determined that the first picture subblock is obtained after the split, split the current picture block in the split mode to obtain a plurality of picture subblocks.

The plurality of picture subblocks obtained after the split definitely include the first picture subblock.

Step 804: Determine that a same prediction mode is used for the plurality of picture subblocks, where the prediction mode for the plurality of picture subblocks is an intra prediction mode or an inter prediction mode.

In this application, the same prediction mode, that is, the intra prediction mode or the inter prediction mode, is used for the plurality of picture subblocks obtained after the split, so that there is no need to parse all bitstreams, thereby improving efficiency. This process may include: parsing a bitstream of the current picture block to determine a prediction mode for a second picture subblock, where the second picture subblock is a picture subblock that is first determined as a CU in the plurality of picture subblocks according to a processing sequence; and determining a prediction mode for a picture subblock other than the second picture subblock in the plurality of picture subblocks based on the prediction mode for the second picture subblock. It should be noted that another method may also be used in this process. This is not specifically limited in this application.

The second picture subblock is the picture subblock that is first determined as the CU according to the processing sequence in the plurality of picture subblocks obtained after the current picture block is split. The split mode for the picture subblock may be known by parsing the bitstream. If the picture subblock is not further split, the picture subblock is determined as the CU. When there are a plurality of picture subblocks, an encoding device or a decoding device has a preset processing sequence. According to the sequence, a picture subblock that is first determined as a CU is the second picture subblock.

It should be noted that step 802 and step 803 are not subject to a specific sequence in this application. In addition to the execution process described in the foregoing method embodiment, in the prediction mode determining method provided in this application, after the split mode for the current picture block is determined, the current picture block is first split in the split mode to obtain the plurality of picture subblocks. Then, it is determined whether the plurality of picture subblocks obtained after the split include the first picture subblock, and the area of the first picture subblock is less than the specified threshold. Finally, the prediction mode for the plurality of picture subblocks is determined.

In this embodiment of this application, prediction modes include an intra prediction mode and an inter prediction mode. The inter prediction mode includes a skip mode (Skip Mode), a direct mode (Direct Mode), or a common inter mode.

Figure 9:
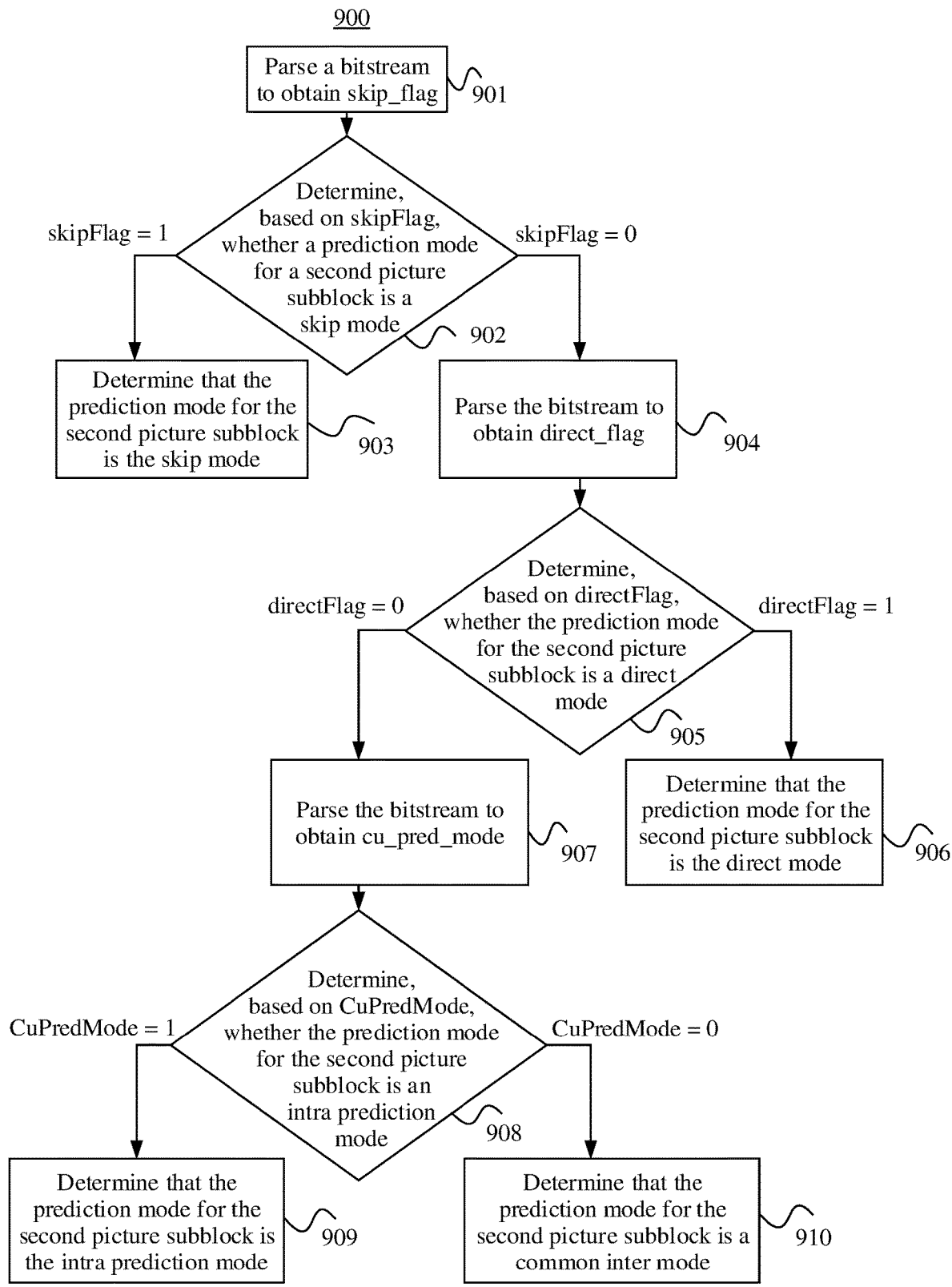
FIG. 9 is a flowchart of a prediction mode determining method according to an embodiment of this application.

FIG. 9 is a flowchart of a prediction mode determining method according to an embodiment of this application. In the process 900, a prediction mode for a second picture subblock is determined. The process 900 may be performed by the video encoder 20 or the video decoder 30. The process 900 is described as a series of steps or operations. It should be understood that the steps or operations of the process 900 may be performed in various sequences and/or may be performed simultaneously, and are not limited to an execution sequence shown in FIG. 9. As shown in FIG. 9, the method includes the following steps.

Step 901: Parse a bitstream to obtain skip_flag.

Herein, skip_flag is a skip mode identifier of the second picture subblock. When skip_flag=1, it indicates that a skip mode is used for the second picture subblock. When skip_flag=0, it indicates that the skip mode is not used for the second picture subblock. A value of skipFlag is the same as that of skip_flag. If skip_flag does not exist in the bitstream, the value of skipFlag is 0.

Step 902: Determine, based on skipFlag, whether the prediction mode for the second picture subblock is the skip mode.

If skipFlag=1, step 903 is performed. If skipFlag=0, step 904 is performed.

Step 903: Determine that the prediction mode for the second picture subblock is the skip mode.

After step 903 is performed, the prediction mode for the second picture subblock has been determined. In this case, only skip_flag needs to be obtained by parsing the bitstream, and direct_flag and cu_pred_mode do not need to be obtained by parsing the bitstream. That is, there is no need to parse all bitstreams.

Step 904: Parse the bitstream to obtain direct_flag.

Herein, direct_flag is a direct mode identifier of the second picture subblock. When direct_flag=1, it indicates that a direct mode is used for the second picture subblock. When direct_flag=0, it indicates that the direct mode is not used for the second picture subblock. A value of directFlag is the same as that of direct_flag. If direct_flag does not exist in the bitstream, the value of directFlag is 0.

Step 905: Determine, based on directFlag, whether the prediction mode for the second picture subblock is the direct mode.

If directFlag=1, step 906 is performed. If directFlag=0, step 907 is performed.

Step 906: Determine that the prediction mode for the second picture subblock is the direct mode.

After step 906 is performed, the prediction mode for the second picture subblock has been determined. In this case, only skip_flag and direct_flag need to be obtained by parsing the bitstream, and cu_pred_mode does not need to be obtained by parsing the bitstream. That is, there is no need to parse all bitstreams.

Step 907: Parse the bitstream to obtain cu_pred_mode.

Herein, cu_pred_mode is a prediction mode identifier of the second picture subblock. When cu_pred_mode=1, it indicates that an intra prediction mode is used for the second picture subblock. When cu_pred_mode=0, it indicates that a common inter prediction mode is used for the second picture subblock. A value of CuPredMode is the same as that of cu_pred_mode. If cu_pred_mode does not exist in the bitstream and a current frame is an I frame, the value of CuPredMode is 1.

Step 908: Determine, based on CuPredMode, whether the prediction mode for the second picture subblock is the intra prediction mode.

If CuPredMode=1, step 909 is performed. If CuPredMode=0, step 910 is performed.

Step 909: Determine that the prediction mode for the second picture subblock is the intra prediction mode.

Step 910: Determine that the prediction mode for the second picture subblock is the common inter mode.

After step 910 is performed, the prediction mode for the second picture subblock has been determined. In this case, all the identifiers skip_flag, direct_flag, and cu_pred_mode are obtained by parsing the bitstream.

Figure 10:
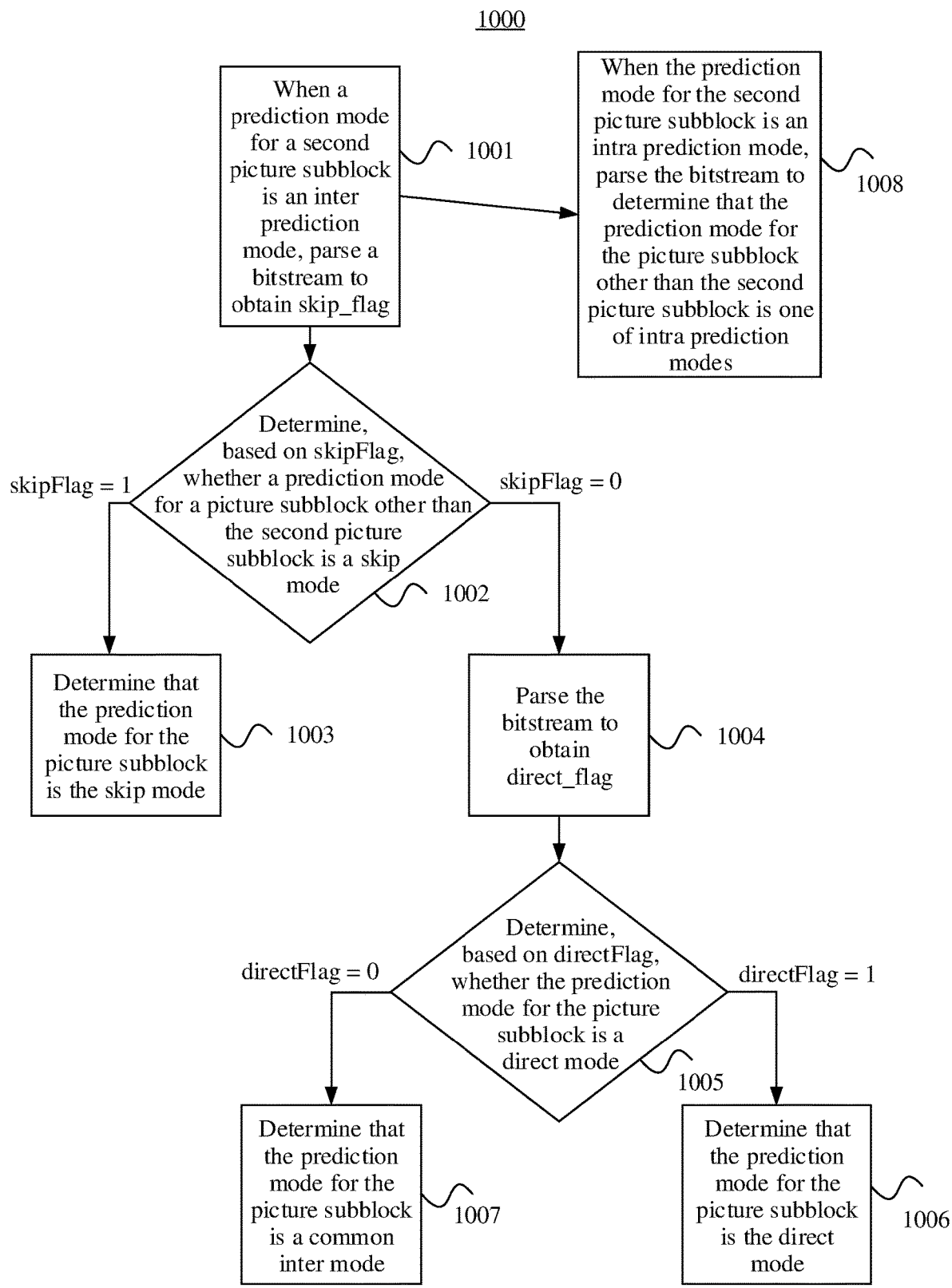
FIG. 10 is a flowchart of a prediction mode determining method according to an embodiment of this application.

FIG. 10 is a flowchart of a prediction mode determining method according to an embodiment of this application. In the process 1000, a prediction mode for a picture subblock other than a second picture subblock is determined. The process 1000 may be performed by the video encoder 20 or the video decoder 30. The process 1000 is described as a series of steps or operations. It should be understood that the steps or operations of the process 1000 may be performed in various sequences and/or may be performed simultaneously, and are not limited to an execution sequence shown in FIG. 10. As shown in FIG. 10, the method includes the following steps.

Step 1001: When a prediction mode for the second picture subblock is an inter prediction mode, parse a bitstream to obtain skip_flag.

Herein, skip_flag is a skip mode identifier of the picture subblock other than the second picture subblock. When skip_flag=1, it indicates that a skip mode is used for the picture subblock. When skip_flag=0, it indicates that the skip mode is not used for the picture subblock. A value of skipFlag is the same as that of skip_flag. If skip_flag does not exist in the bitstream, the value of skipFlag is 0.

Step 1002: Determine, based on skipFlag, whether the prediction mode for the picture subblock is the skip mode.

If skipFlag=1, step 1003 is performed. If skipFlag=0, step 1004 is performed.

Step 1003: Determine that the prediction mode for the picture subblock is the skip mode.

After step 1003 is performed, the prediction mode for the picture subblock has been determined. In this case, only skip_flag needs to be obtained by parsing the bitstream, and direct_flag and cu_pred_mode do not need to be obtained by parsing the bitstream. That is, there is no need to parse all bitstreams.

Step 1004: Parse the bitstream to obtain direct_flag.

Herein, direct_flag is a direct mode identifier of the picture subblock. When direct_flag=1, it indicates that a direct mode is used for the picture subblock. When direct_flag=0, it indicates that the direct mode is not used for the picture subblock. A value of directFlag is the same as that of direct_flag. If direct_flag does not exist in the bitstream, the value of directFlag is 0.

Step 1005: Determine, based on directFlag, whether the prediction mode for the picture subblock is the direct mode.

If directFlag=1, step 1006 is performed. If directFlag=0, step 1007 is performed.

Step 1006: Determine that the prediction mode for the picture subblock is the direct mode.

After step 1006 is performed, the prediction mode for the picture subblock has been determined. In this case, only skip_flag and direct_flag need to be obtained by parsing the bitstream, and cu_pred_mode does not need to be obtained by parsing the bitstream. That is, there is no need to parse all bitstreams.

Step 1007: Determine that the prediction mode for the picture subblock is a common inter mode.

Because the inter prediction mode is used for the second picture subblock, for consistency, only the inter prediction mode is selected for the picture subblock other than second picture subblock. After step 1007 is performed, only the common inter mode can be used. Therefore, it is determined that the prediction mode for the picture subblock is the common inter mode, and cu_pred_mode does not need to be obtained by parsing the bitstream.

Step 1008: When the prediction mode for the second picture subblock is an intra prediction mode, parse the bitstream to determine that the prediction mode for the picture subblock other than the second picture subblock is one of intra prediction modes.

For example, the intra prediction modes include an intra luma prediction mode and an intra chroma prediction mode. Two identifiers may be used to determine an intra prediction mode that is used as the prediction mode for the picture subblock. To be specific, intra_luma_prediction_mode is used to determine an intra prediction mode for a luma block, and a value of intra_luma_prediction_mode ranges from 0 to 32. In addition, intra_chroma_prediction_mode is used to determine an intra prediction mode for two chroma blocks whose PredBlockOrders are NumOfIntraPredBlock and NumOfIntraPredBlock+1 in a coding block in a format of 4:2:0.

Because the intra prediction mode is used for the second picture subblock, for consistency, only the intra prediction mode can be used for the picture subblock other than the second picture subblock. After step 1008 is performed, the prediction mode for the picture subblock can be determined without obtaining any identifier by parsing the bitstream.

In the embodiments of this application, in a process of determining the prediction mode for the current picture block based on the bitstream of the current picture block, a prediction mode for a picture subblock with a relatively small area is determined based on a prediction mode for a picture subblock obtained by splitting the current picture block. Therefore, there is no need to parse all bitstreams, and a prediction mode that is the same as that of the another picture subblock is used for a picture subblock with a small area, thereby facilitating hardware pipeline processing.

It should be noted that the plurality of identifier variables or names in the foregoing embodiments are examples for description, and may alternatively be represented by using any other format or name. This is not specifically limited in this application.

Figure 11:
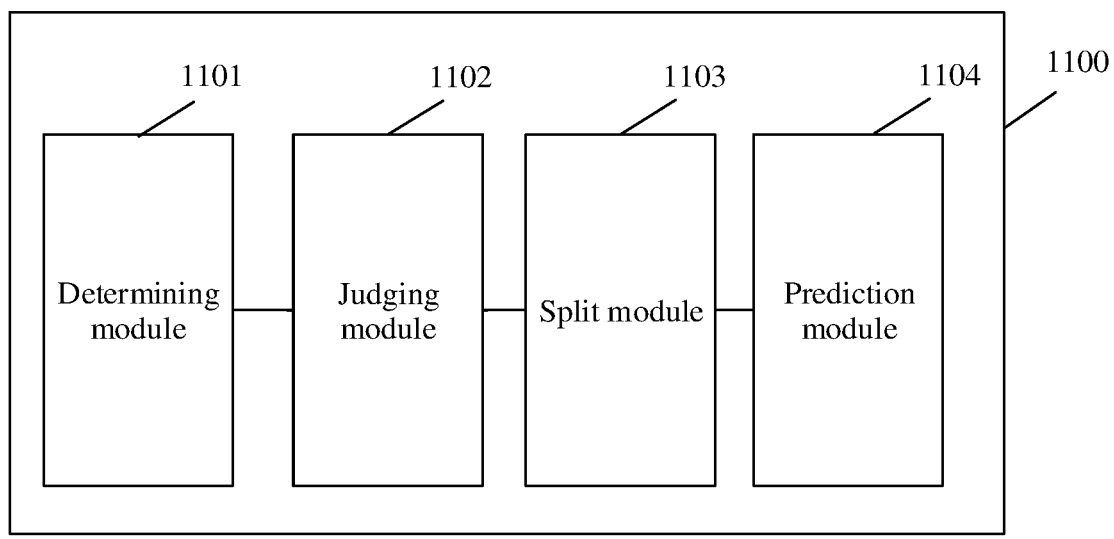
FIG. 11 is a schematic block diagram of a prediction mode determining apparatus 1100 according to an embodiment of this application.

FIG. 11 is a schematic block diagram of a prediction mode determining apparatus 1100 according to an embodiment of this application. The prediction mode determining apparatus 1100 may include a determining module 1101, a judging module 1102, a split module 1103, and a prediction module 1104. The determining module 1101 is configured to determine a split mode for a current picture block. The judging module 1102 is configured to determine whether a first picture subblock that meets a preset condition is obtained after the current picture block is split in the split mode. The split module 1103 is configured to: if it is determined that the first picture subblock is obtained after the split, split the current picture block in the split mode to obtain a plurality of picture subblocks, where the plurality of picture subblocks include the first picture subblock. The prediction module 1104 is configured to determine that a same prediction mode is used for the plurality of picture subblocks, where the prediction mode for the plurality of picture subblocks is an intra prediction mode or an inter prediction mode.

In a possible implementation, the preset condition includes that an area of the first picture subblock is less than or equal to a specified threshold.

In a possible implementation, the prediction module 1104 is specifically configured to: parse a bitstream of the current picture block to determine a prediction mode for a second picture subblock, where the second picture subblock is a picture subblock that is first determined as a coding unit CU in the plurality of picture subblocks, and the prediction mode for the second picture subblock is the intra prediction mode or the inter prediction mode; and determine a prediction mode for a picture subblock other than the second picture subblock in the plurality of picture subblocks based on the prediction mode for the second picture subblock, where the prediction mode for the picture subblock and the prediction mode for the second picture subblock are both the intra prediction mode or the inter prediction mode.

In a possible implementation, the inter prediction mode includes a skip mode, a direct mode, or a common inter mode.

In a possible implementation, the prediction module 1104 is specifically configured to: when the prediction mode for the second picture subblock is the inter prediction mode, parse the bitstream to obtain a skip mode identifier of the picture subblock, and determine, based on the skip mode identifier, whether the prediction mode for the picture subblock is the skip mode; and if the skip mode identifier indicates that the skip mode is used, determine that the prediction mode for the picture subblock is the skip mode.

In a possible implementation, the prediction module 1104 is further configured to: if the skip mode identifier indicates that the skip mode is not used, parse the bitstream to obtain a direct mode identifier of the picture subblock, and determine, based on the direct mode identifier, whether the prediction mode for the picture subblock is the direct mode; and if the direct mode identifier indicates that the direct mode is used, determine that the prediction mode for the picture subblock is the direct mode; or if the direct mode identifier indicates that the direct mode is not used, determine that the prediction mode for the picture subblock is the common inter mode.

In a possible implementation, the prediction module 1104 is specifically configured to: when the prediction mode for the second picture subblock is the intra prediction mode, parse the bitstream to determine that the prediction mode for the picture subblock is one of intra prediction modes.

In a possible implementation, the judging module 1102 is specifically configured to: if an area of the current picture block meets the following condition, determine that the first picture subblock is obtained after the split: when the split mode is a binary tree BT split mode, sizeC/2 is less than S, where sizeC is the area of the current picture block, and S is a preset area threshold; or when the split mode is a quadtree QT split mode, sizeC/4 is less than S; or when the split mode is an extended quadtree EQT split mode, sizeC/4 is less than S.

In a possible implementation, the split module 1103 is further configured to: if it is determined that the first picture subblock is not obtained after the split, split the current picture block in the split mode to obtain a plurality of picture subblocks, separately determine split modes for the plurality of picture subblocks, and split each of the picture subblocks in a corresponding split mode.

In a possible implementation, the prediction module 1104 is specifically configured to: parse the bitstream to obtain a skip mode identifier of the second picture subblock, and determine, based on the skip mode identifier, whether the prediction mode for the second picture subblock is the skip mode; and if the skip mode identifier indicates that the skip mode is used, determine that the prediction mode for the second picture subblock is the skip mode.

In a possible implementation, the prediction module 1104 is further configured to: if the skip mode identifier indicates that the skip mode is not used, parse the bitstream to obtain a direct mode identifier of the second picture subblock, and determine, based on the direct mode identifier, whether the prediction mode for the second picture subblock is the direct mode; and if the direct mode identifier indicates that the direct mode is used, determine that the prediction mode for the second picture subblock is the direct mode.

In a possible implementation, the prediction module 1104 is further configured to: if the direct mode identifier indicates that the direct mode is not used, parse the bitstream to obtain a prediction mode identifier of the second picture subblock, and determine, based on the prediction mode identifier, whether the prediction mode for the second picture subblock is the intra prediction mode; and if the prediction mode identifier indicates that the intra prediction mode is used, determine that the prediction mode for the second picture subblock is the intra prediction mode; or if the prediction mode identifier indicates that the common inter mode is used, determine that the prediction mode for the second picture subblock is the common inter mode.

It should be noted that modules in the inter prediction apparatus in this embodiment of this application are functional bodies for implementing various execution steps included in the inter prediction method in this application, to be specific, functional bodies that can implement all steps in the inter prediction method in this application and extensions and variants of these steps. For details, refer to descriptions of the inter prediction method in this specification. For brevity, details are not described in this specification.

A person skilled in the art can understand that the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A prediction mode determining method implemented by a coding device, comprising:
   determining a split mode for a current picture block, wherein the split mode includes quadtree (QT) split mode, binary tree (BT) split mode, ternary tree (TT) split mode, or extended quadtree (QT) split mode;
   determining whether a first picture subblock that meets a preset condition is obtained in case that the current picture block is split in the split mode; and
   determining that a same prediction mode is used for a plurality of picture subblocks that are obtained by splitting the current picture block in the split mode, wherein the plurality of picture subblocks comprise the first picture subblock, and wherein the prediction mode for the plurality of picture subblocks is an intra prediction mode or an inter prediction mode, wherein the inter prediction mode includes a skip mode, a direct mode, or a common inter mode.

2. The method according to claim 1, wherein the preset condition comprises an area of the first picture subblock being less than or equal to a specified threshold.

3. The method according to claim 1, wherein the determining that the same prediction mode is used for the plurality of picture subblocks comprises:
   determining a prediction mode for a second picture subblock, wherein the second picture subblock is a picture subblock that is first determined as a coding unit in the plurality of picture subblocks, and the prediction mode for the second picture subblock is the intra prediction mode or the inter prediction mode; and
   determining a prediction mode for a picture subblock other than the second picture subblock in the plurality of picture subblocks based on the prediction mode for the second picture subblock, wherein the prediction mode for the picture subblock other than the second picture subblock and the prediction mode for the second picture subblock both are the intra prediction mode or the inter prediction mode.

4. The method according to claim 3, wherein the determining the prediction mode for the picture subblock other than the second picture subblock in the plurality of picture subblocks based on the prediction mode for the second picture subblock comprises:
   determining whether the prediction mode for the picture subblock is a skip mode in response to the prediction mode for the second picture subblock being the inter prediction mode; and
   encoding a skip mode identifier of the picture subblock in a bitstream, the skip mode identifier indicating whether the skip mode is used.

5. The method according to claim 4, wherein the determining the prediction mode for the picture subblock other than the second picture subblock in the plurality of picture subblocks based on the prediction mode for the second picture subblock further comprises:
   determining whether the prediction mode for the picture subblock is a direct mode in response to the prediction mode for the second picture subblock being not skip mode; and
   encoding a direct mode identifier of the picture subblock in the bitstream, the direct mode identifier indicating whether the direct mode is used.

6. The method according to claim 3, wherein the determining the prediction mode for the picture subblock other than the second picture subblock in the plurality of picture subblocks based on the prediction mode for the second picture subblock comprises:
   determining that the prediction mode for the picture subblock is one of a set of intra prediction modes in response to the prediction mode for the second picture subblock being the intra prediction mode; and
   encoding information of the determined intra prediction mode in a bitstream.

7. The method according to claim 1, wherein the first picture subblock is obtained when an area of the current picture block meets following condition:
   in response to the split mode being the BT split mode, a size C/2 is less than S, wherein the size C is the area of the current picture block, and S is a preset area threshold; or
   in response to the split mode being the QT split mode, a size C/4 is less than S; or
   in response to the split mode being the extended QT split mode, a size C/4 is less than S.

8. The method according to claim 1, wherein the determining that the same prediction mode is used for the plurality of picture subblocks comprises:
   obtaining a prediction mode identifier of the first picture subblock; and
   determining that the prediction mode for the first picture subblock is the intra prediction mode in response to the prediction mode identifier indicating that the intra prediction mode is used.

9. The method according to claim 1, wherein the determining that the same prediction mode is used for the plurality of picture subblocks comprises:
   obtaining a prediction mode identifier of the first picture subblock; and
   determining that the prediction mode for the first picture subblock is the inter mode in response to the prediction mode identifier indicating that the inter prediction mode is used.

10. A prediction mode determining apparatus, comprising:
    a memory; and
    one or more processors coupled to the memory and configured to
    determine a split mode for a current picture block, wherein the split mode includes quadtree (QT) split mode, binary tree (BT) split mode, ternary tree (TT) split mode, or extended quadtree (QT) split mode;

determine whether a first picture subblock that meets a preset condition is obtained in case that the current picture block is split in the split mode; and determine that a same prediction mode is used for a plurality of picture subblocks that are obtained by splitting the current picture block in the split mode, wherein the plurality of picture subblocks comprise the first picture subblock, and wherein the prediction mode for the plurality of picture subblocks is an intra prediction mode or an inter prediction mode, wherein the inter prediction mode includes a skip mode, a direct mode, or a common inter mode.

11. The apparatus according to claim 10, wherein the preset condition comprises an area of the first picture subblock being less than or equal to a specified threshold.

12. The apparatus according to claim 10, wherein the one or more processors are further configured to:

determine a prediction mode for a second picture subblock, wherein the second picture subblock is a picture subblock that is first determined as a coding unit in the plurality of picture subblocks, and the prediction mode for the second picture subblock is the intra prediction mode or the inter prediction mode; and determine a prediction mode for a picture subblock other than the second picture subblock in the plurality of picture subblocks based on the prediction mode for the second picture subblock, wherein the prediction mode for the picture subblock other than the second picture subblock and the prediction mode for the second picture subblock both are the intra prediction mode or the inter prediction mode.

13. The apparatus according to claim 12, wherein the one or more processors are further configured to:

determine whether the prediction mode for the picture subblock is a skip mode in response to the prediction mode for the second picture subblock being the inter prediction mode; and encode a skip mode identifier of the picture subblock in a bitstream, the skip mode identifier indicating whether the skip mode is used.

14. The apparatus according to claim 13, wherein the one or more processors are further configured to:

determine whether the prediction mode for the picture subblock is a direct mode in response to the prediction mode for the second picture subblock being not skip mode; and encode a direct mode identifier of the picture subblock in the bitstream, the direct mode identifier indicating whether the direct mode is used.

15. The apparatus according to claim 12, wherein the one or more processors are further configured to:

determine that the prediction mode for the picture subblock is one of a set of intra prediction modes in response to the prediction mode for the second picture subblock being the intra prediction mode; and encode information of the determined intra prediction mode in a bitstream.

16. The apparatus according to claim 10, wherein the first picture subblock is obtained when an area of the current picture block meets following condition:

in response to the split mode being the BT split mode, a size C/2 is less than S, wherein the size C is the area of the current picture block, and S is a preset area threshold; or in response to the split mode being the QT split mode, a size C/4 is less than S; or in response to the split mode being the extended QT split mode, a size C/4 is less than S.

17. The apparatus according to claim 10, wherein the one or more processors are further configured to:

obtain a prediction mode identifier of the first picture subblock; and determine that the prediction mode for the first picture subblock is the intra prediction mode in response to the prediction mode identifier indicating that the intra prediction mode is used.

18. The apparatus according to claim 10, wherein the one or more processors are configured to:

obtain a prediction mode identifier of the first picture subblock; and determine that the prediction mode for the first picture subblock is the inter mode in response to the prediction mode identifier indicating that the inter prediction mode is used.

19. A non-transitory computer-readable recording medium storing a bitstream that is used by a coding device to generate a video, the bitstream comprising:

a current picture block for which a split mode is determined, wherein the split mode includes quadtree (QT) split mode, binary tree (BT) split mode, ternary tree (TT) split mode, or extended quadtree (QT) split mode;

a first picture subblock that meets a preset condition is obtained in case that the current picture block is split in the split mode; and a same prediction mode for a plurality of picture subblocks obtained by splitting the current picture block in the split mode, wherein the plurality of picture subblocks comprise the first picture subblock, and wherein the prediction mode for the plurality of picture subblocks is an intra prediction mode or an inter prediction mode, wherein the inter prediction mode includes a skip mode, a direct mode, or a common inter mode.

* * * * *